US012760749B2

(12) United States Patent
Simone et al.

(10) Patent No.: US 12,760,749 B2
(45) Date of Patent: Oct. 13, 2026

(54) HYDRAULIC CYLINDER AND SYSTEM WITH PRESSURE INTENSIFICATION

(71) Applicant: Doben Limited, Windsor (CA)

(72) Inventors: David Simone, Amherstburg (CA); Larry Koscielski, Lasalle (CA); Eric Michaud, Amherstburg (CA)

(73) Assignee: DOBEN LIMITED, Windsor (CA)

( * ) Notice: Subject to any disclaimer, the term of this patent is extended or adjusted under 35 U.S.C. 154(b) by 0 days.

(21) Appl. No.: 19/295,013

(22) Filed: Aug. 8, 2025

(65) Prior Publication Data

US 2025/0361882 A1 Nov. 27, 2025

Related U.S. Application Data

(63) Continuation-in-part of application No. 18/727,452, filed as application No. PCT/CA2023/050927 on Jul. 10, 2023, now Pat. No. 12,416,316.

(51) Int. Cl.
*F15B 11/032* (2006.01)
*F15B 11/024* (2006.01)
(Continued)

(52) U.S. Cl.
CPC ........ *F15B 11/0325* (2013.01); *F15B 11/024* (2013.01); *F15B 11/072* (2013.01);
(Continued)

(58) Field of Classification Search
CPC ...... F15B 3/00; F15B 11/022; F15B 11/0325; F15B 11/0725; F15B 2211/31576;
(Continued)

(56) References Cited

U.S. PATENT DOCUMENTS 2,032,185 A 2/1936 Sciaky
2,640,426 A 6/1953 McLeod
(Continued)

FOREIGN PATENT DOCUMENTS

CA 0309337 A 3/1931
CN 101666339 A 3/2010
(Continued)

OTHER PUBLICATIONS

International Preliminary Report on Patentability for International Application No. PCT/CA2023/050927 mailed Jan. 22, 2026.
(Continued)

*Primary Examiner* — Michael Leslie
(74) *Attorney, Agent, or Firm* — Carlson, Gaskey & Olds, P.C.

(57) ABSTRACT

A pressure cylinder includes a working cylinder and an intensification cylinder that is divided by a separator block. A working piston is arranged in the working cylinder and connected to a working rod that extends to an end portion. An intensification piston and an intensification rod are arranged in the intensification cylinder. A pump is configured to provide a pressurized hydraulic fluid to the pressure cylinder. A fluid reservoir is configured to supply a hydraulic fluid to the pump. An overpressure circuit fluidly connects the advance working chamber and the retract passage, a pressure relief valve is arranged in overpressure circuit, the pressure relief valve is configured to open from a normally closed position to communicate fluid from the advance working chamber to the retract passage when the advance working chamber reaches an undesired threshold.

19 Claims, 15 Drawing Sheets

(51) Int. Cl.
*F15B 11/072* (2006.01)
*F15B 21/00* (2006.01)

(52) U.S. Cl.
CPC ... *F15B 21/001* (2013.01); *F15B 2211/20515* (2013.01); *F15B 2211/3058* (2013.01); *F15B 2211/50518* (2013.01); *F15B 2211/6309* (2013.01); *F15B 2211/6313* (2013.01); *F15B 2211/6336* (2013.01); *F15B 2211/775* (2013.01)

(58) Field of Classification Search
CPC .......... F15B 2211/327; F15B 2211/329; F15B 2211/775
See application file for complete search history.

(56) References Cited

U.S. PATENT DOCUMENTS

| | | | | |
|---|---|---|---|---|
| 2,918,795 | A | 12/1959 | Marien | |
| 3,748,860 | A | 7/1973 | Castleberry | |
| 3,875,365 | A | 4/1975 | Beneteau | |
| 4,099,436 | A | 7/1978 | Beneteau | |
| 5,649,424 | A * | 7/1997 | Valavaara | F15B 11/0725 60/560 |
| 5,836,161 | A * | 11/1998 | Malina | F15B 3/00 60/563 |
| 6,003,429 | A | 12/1999 | Nakabayashi et al. | |
| 6,581,379 | B2 * | 6/2003 | Nomura | B22D 17/203 60/563 |
| 6,751,954 | B2 | 6/2004 | Bridger et al. | |
| 6,895,749 | B2 * | 5/2005 | Tohru | F15B 11/0325 60/563 |
| 7,263,831 | B2 * | 9/2007 | Sawdon | F15B 3/00 60/591 |
| 7,301,118 | B2 | 11/2007 | Mallette | |
| 7,802,352 | B2 | 9/2010 | Chitty et al. | |
| 8,448,432 | B2 | 5/2013 | Bresie | |
| 8,613,602 | B2 | 12/2013 | Iversen | |
| 9,816,535 | B2 * | 11/2017 | Gresser | F15B 11/0725 |
| 10,302,101 | B2 * | 5/2019 | Schaber | F15B 13/0401 |
| 10,900,501 | B2 | 1/2021 | Trieb | |
| 10,935,055 | B2 | 3/2021 | Richter et al. | |
| 11,015,619 | B2 * | 5/2021 | Erhard | B22D 17/203 |
| 11,649,836 | B2 * | 5/2023 | Erhard | B22D 17/2069 164/4.1 |
| 2002/0029569 | A1 | 3/2002 | Nomura et al. | |
| 2003/0172652 | A1 | 9/2003 | Tohru | |
| 2005/0144944 | A1 | 7/2005 | Sawdon et al. | |
| 2018/0023597 | A1 | 1/2018 | Erhard et al. | |
| 2021/0108655 | A1 | 4/2021 | Erhard et al. | |

FOREIGN PATENT DOCUMENTS

| | | | |
|---|---|---|---|
| CN | 201771519 | U | 3/2011 |
| DE | 3911033 | A1 | 10/1990 |
| EP | 0367143 | A2 | 5/1990 |
| JP | 2022089901 | A | 6/2022 |
| WO | 2004102010 | A1 | 11/2004 |

OTHER PUBLICATIONS

Chinese Office Action for Chinese Application No. 202380099269.7 mailed Mar. 14, 2026.
Supplementary European Search Report for European Application No. 23944541.4 mailed May 11, 2026.
“Ohma Weld Cylinder Product Guide, Version 3.0” Centerline (Windsor) Limited, Feb. 2004.
“Ohma Piercing Cylinder Product Guide, Version 3.0,” Centerline (Windsor) Limited, Jul. 2003.
International Search Report and Written Opinion for International Application No. PCT/CA2023/050927 mailed Apr. 4, 2024.
Korean Office Action for Korean Application No. 10-2025-7035188 dated Apr. 29, 2026.

* cited by examiner

HYDRAULIC CYLINDER AND SYSTEM WITH PRESSURE INTENSIFICATION

PRIORITY CLAIM

This application is a Continuation-In-Part of U.S. patent application Ser. No. 18/727,452 filed Jul. 9, 2024, which is a United States National Phase of International Application No. PCT/CA2023/050927 filed Jul. 10, 2023.

TECHNICAL FIELD

This disclosure relates to a hydraulic cylinder and a system employing pressure intensification.

BACKGROUND

Pneumatic intensification cylinders have been used for resistance welding and metal working applications, such as bending, clinching, coining, forming, piercing, riveting, and stamping. Two examples of prevalent pneumatic intensification cylinders are described in U.S. Pat. Nos. 3,875,365 and 4,099,436, which are embodied in Applicant's OHMA® cylinders. One drawback of such cylinders is it is expensive to continuously generate and supply compressed air, and not all manufacturing locations may be able to supply air at the necessary pressure for operation.

Servoelectric actuators are being increasingly applied in place of all forms of pneumatic cylinders for these process applications because control integration is claimed to make setup and maintenance of the servoelectric equipment easier, programmability leads to a reduction of inventory by eliminating the need to provide actuators with specific work and retract stroke combinations, and programmable operation improves functional capability (e.g., programmable stroke and coordinated motion).

Servoelectric actuators with the capability to provide sufficient thrust, generally incorporate a ball or roller screw to convert rotary motion to linear motion. The force generation consistency and dynamic response of such actuators is directly related to the technology and manufacturing precision employed. Precision ball screws and planetary roller screws are expensive. Such actuators are comparatively large, subject to mechanical performance limitations, and increase mechanical complexity while decreasing operational reliability. Linear servomotors are available, but they do not deliver equivalent or sufficient values of force.

Servoelectric control systems need to optimize torque and speed. Sizing a general application servoelectric motor and control to provide both high speed and high torque performance, results in a system larger than would be necessary for torque or speed control alone. Initial motion is usually based on velocity control to maximize the closing or advancing speed. When the tooling engages the workpiece, the control has to switch over to torque control to perform the principal work. Then the control has to revert back to velocity control to maximize retracting speed. The execution of these control methodology changes adds programming and tuning complexity and interruptions in the servo motion profile.

SUMMARY

In one exemplary embodiment, a hydraulic pressure cylinder system includes a pressure cylinder that includes a working cylinder and an intensification cylinder divided by a separator block, a working piston that is arranged in the working cylinder and connected to a working rod that extends to an end portion, the working piston separates the working cylinder into an advance working chamber and a retract working chamber, an intensification piston and an intensification rod that is arranged in the intensification cylinder, the intensification piston separates the intensification cylinder into an advance intensification chamber and a retract intensification chamber. A pump is configured to provide a pressurized hydraulic fluid to the pressure cylinder. A fluid reservoir is configured to supply a hydraulic fluid to the pump. A first valve is configured to selectively regulate hydraulic fluid flow between the pressure cylinder and the fluid reservoir and the pump, the pump is selectively fluidly connected to the retract working chamber and the retract intensification chamber through a retract passage via the first valve. A second valve is configured to selectively regulate fluid flow between a first valve and the advance intensification chamber. An overpressure circuit fluidly connects the advance working chamber and the retract passage, a pressure relief valve is arranged in overpressure circuit, the pressure relief valve is configured to open from a normally closed position to communicate fluid from the advance working chamber to the retract passage when the advance working chamber reaches an undesired threshold. A controller is in communication with the first valve and the second valve, the controller is configured to coordinate movement of the working piston and the intensification piston between a rest state, an advancing state, an advanced state, an intensified state, and a retracted state. The advanced state is configured to engage the end portion with a workpiece, and the intensified state is configured to perform an operation on the workpiece with the end portion.

In a further embodiment of any of the above, the system includes a supply passage that fluidly connects the fluid reservoir to a supply side of the pump, a pressurized fluid passage that fluidly connects a pressure side of the pump to the first valve, a return passage that fluidly connects the first valve to a fluid reservoir, and an advance passage that fluidly connects the first valve to the advance working chamber.

In a further embodiment of any of the above, the first valve is a 4-way valve that includes a first position that is configured to fluidly connect the pressurized fluid passage to the return passage, a second position that is configured to fluidly connect the pressurized fluid passage to the advance passage, and to fluidly connect the retract passage to the return passage, and a third position that is configured to fluidly connect the advance passage to the return passage, and to fluidly connect the pressurized fluid passage to the retract passage.

In a further embodiment of any of the above, the first valve is mounted to the fluid reservoir.

In a further embodiment of any of the above, the second valve is a directional valve that includes a first position that fluidly blocks fluid flow from the advance passage to the advance intensification chamber, and a second position that fluidly connects the advance passage to the advance intensification chamber.

In a further embodiment of any of the above, the second valve is integrated with an end block of the pressure cylinder.

In a further embodiment of any of the above, the system includes an equalization circuit that fluidly connects an intensification passage to the retract passage. The equalization circuit includes a check valve that is configured to block fluid flow from the retract passage to the intensification passage but permit fluid flow from the intensification passage to the retract passage via a flow metering orifice.

In a further embodiment of any of the above, the equalization circuit is integrated with an end block of the pressure cylinder.

In a further embodiment of any of the above, the rest state includes the first valve in the first position, and the working piston and the intensification piston are both in retracted positions.

In a further embodiment of any of the above, the advancing state includes the first valve in the second position and the second valve in the first position, with pressurized fluid that is configured to axially move the intensification rod toward the advance working chamber. The advanced state includes the first valve in the second position and the second valve in the first position, with the pressurized fluid configured to continue to axially move the intensification rod toward the advance working chamber until the flow of pressurized fluid to at least the advance working chamber is blocked by the intensification rod.

In a further embodiment of any of the above, the intensified state includes the first valve in the second position and the second valve in the second position. The intensification rod impinges into the advance working chamber.

In a further embodiment of any of the above, the retracted state includes the first valve in the third position and the second valve in the first position, with pressurized fluid configured to flow to the retract intensification chamber and the retract work chamber.

In a further embodiment of any of the above, the pressure relief valve is mounted to the separator block.

In a further embodiment of any of the above, the separator block includes a bore in which the intensification rod is at least partially arranged. A port is arranged on the separator block and fluidly connects the advance passage to the bore. The port is configured to be fluidly unblocked by the intensification rod in the rest state, the advancing state, the advanced state, and the retracted state, and the port is configured to be fluidly blocked by the intensification rod in the intensified state.

In a further embodiment of any of the above, the working piston and the working rod include a hole that is configured to receive the intensification rod in the intensified state.

In a further embodiment of any of the above, the system includes a pressure sensor that is in communication with the controller and in fluid communication with the advanced working chamber. The pressure sensor is configured to produce a signal that corresponds to a pressure within the advanced working chamber. The controller is configured to monitor the signal and to command a motor driving the pump to the pressure between first and second pressure thresholds. The pump is a positive displacement pump.

In another exemplary embodiment, a hydraulic pressure cylinder system includes a pressure cylinder that includes a working cylinder and an intensification cylinder divided by a separator block. A working piston is arranged in the working cylinder and connected to a working rod that extends to an end portion. The working piston separates the working cylinder into an advance working chamber and a retract working chamber, an intensification piston and an intensification rod that is arranged in the intensification cylinder. The intensification piston separates the intensification cylinder into an advance intensification chamber and a retract intensification chamber. A pump is configured to provide a pressurized hydraulic fluid to the pressure cylinder. A fluid reservoir is configured to supply a hydraulic fluid to the pump. A first valve is configured to selectively regulate hydraulic fluid flow between the pressure cylinder and the fluid reservoir and the pump. A second valve is configured to selectively regulate fluid flow between a first valve and the advance intensification chamber. A pressure sensor is in fluid communication with the advanced working chamber, the pressure sensor is configured to produce a signal that corresponds to a pressure within the advance working chamber. A controller is in communication with the first valve, the second valve and the pressure sensor. The controller is configured to coordinate movement of the working piston and the intensification piston between a rest state, an advancing state, an advanced state, an intensified state, and a retracted state. The advanced state is configured to engage the end portion with a workpiece, and the intensified state is configured to perform an operation on the workpiece with the end portion. The controller is configured to monitor the signal and to command a motor driving the pump to maintain the pressure between first and second pressure thresholds.

In a further embodiment of any of the above, the pump is a positive displacement pump.

In another exemplary embodiment, a hydraulic pressure cylinder system includes a pressure cylinder that includes a working cylinder and an intensification cylinder that is divided by a separator block. A working piston is arranged in the working cylinder and connected to a working rod that extends to an end portion. The working piston separates the working cylinder into an advance working chamber and a retract working chamber. An intensification piston and an intensification rod are arranged in the intensification cylinder. The intensification piston separates the intensification cylinder into an advance intensification chamber and a retract intensification chamber. A pump is configured to provide a pressurized hydraulic fluid to the pressure cylinder. A fluid reservoir is configured to supply a hydraulic fluid to the pump. A first valve is configured to selectively regulate hydraulic fluid flow the pump and the advance working chamber and the retract working chamber. The pump is selectively fluidly connected to the retract working chamber and the retract intensification chamber through a retract passage via the first valve. An air source is configured to provide pressurized air. A second valve is fluidly connected to the second valve by another valve, the other valve is configured to selectively provide the pressurized air to the second valve. The second valve is configured to selectively regulate an airflow between the air source and the advance intensification chamber and the retract intensification chamber. An overpressure circuit is fluidly connected to the advance working chamber and the retract passage. A pressure relief valve is arranged in overpressure circuit. The pressure relief valve is configured to open from a normally closed position to communicate fluid from the advance working chamber to the retract passage when the advance working chamber reaches an undesired threshold. A controller is in communication with the first valve and the second valve. The controller is configured to coordinate movement of the working piston and the intensification piston between a rest state, an advancing state, an advanced state, an intensified state, and a retracted state. The advanced state is configured to engage the end portion with a workpiece, and the intensified state is configured to perform an operation on the workpiece with the end portion.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
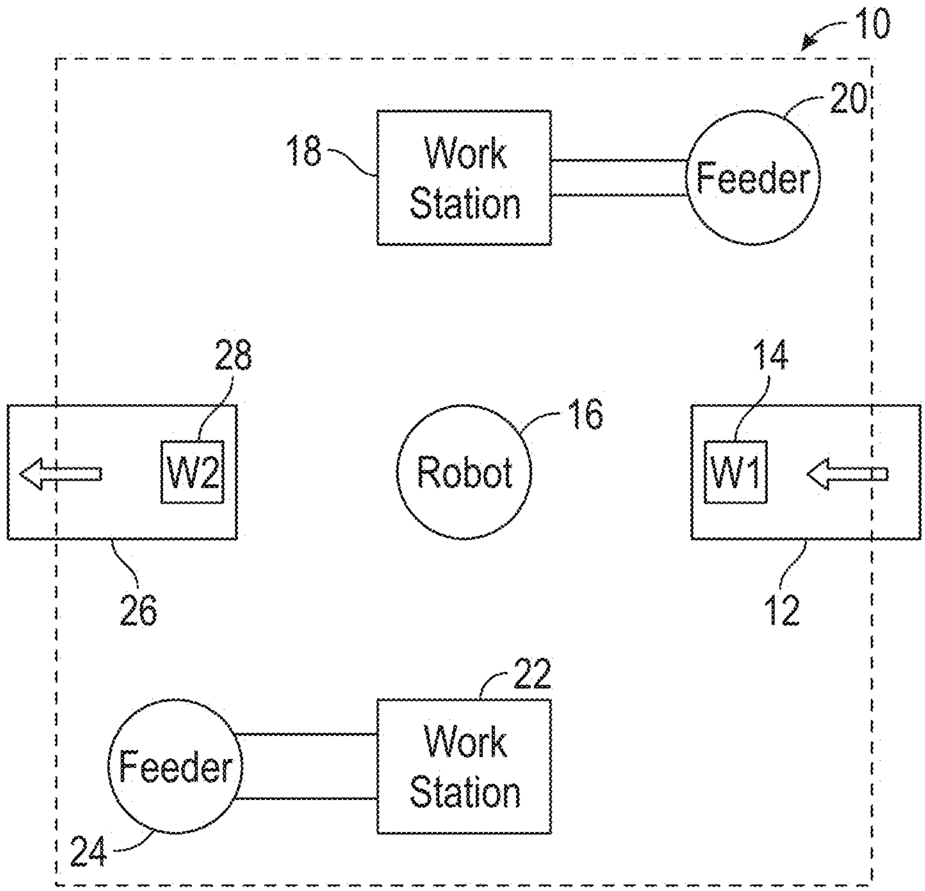
FIG. 1 is a schematic view of an example robotic cell having a work station with a hydraulic intensification cylinder according to this disclosure.

Referring to FIG. 1, a schematic of an example robotic cell 10 is illustrated. The cell 10 includes a first conveyor 12 that feeds a raw workpiece 14 into the cell 10 for one or more operations, such as bending, clinching, coining, forming, piercing, riveting, stamping, and/or resistance welding. A multi-axis robot 16 picks up the raw workpiece 14 and moves it into position at a first work station 18 for an operation. A first feeder 20 may supply a component to the work station, such as a rivet, fastener or other component that may be secured to the raw workpiece 14. Once the operation is completed, the robot 16 may transfer the workpiece to another work station 22 that receives components from another feeder 24. A fewer or greater number of work stations may be provided in the cell 10 than illustrated depending upon the desired operations. Once the operations have been completed on the workpiece, the robot 16 transfers the finished workpiece 28 to another conveyor 26 for processing outside of the cell 10 (e.g., to another manufacturing location or packaging of the finished part).

Figure 2:
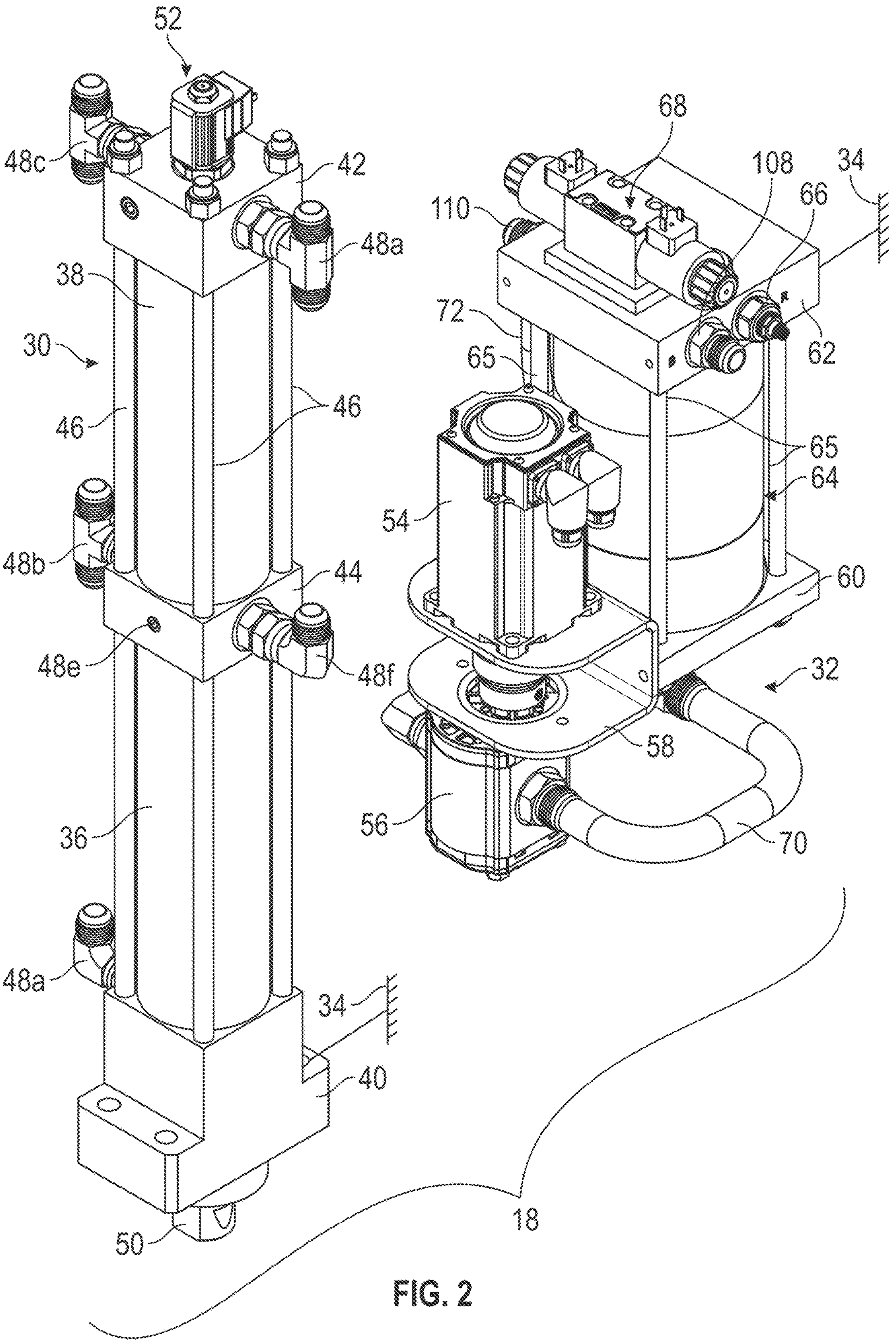
FIG. 2 is a perspective view of an example hydraulic intensification cylinder and pressurized fluid supply assembly for the work station.

In this disclosure, as shown in FIG. 2, one of the work stations 18 incorporates a pressure cylinder 30, or hydraulic pressure cylinder, generally, that is in fluid communication with a pressurized hydraulic fluid supply assembly 32, both of which may be mounted to a common frame 34 such as a pedestal. In a resistance welding application, the pressure cylinder 30 may instead be mounted to, or within, the resistance welding gun mounted to the common frame 34.

In one example, the pressure cylinder 30 includes a working cylinder 36 and an intensification cylinder 38 that are coaxially mounted with respect to one another by first and second end blocks 40, 42 and a separator block 44 clamped together by fasteners 46. It should be understood that the working cylinder 36 and intensification cylinder 38 may be decoupled from one another for packaging, if desired. As shown in FIGS. 4A-4E, the working cylinder 36 houses a working piston 92 from which a working rod 94 extends through the first end block 40 to an end portion 50. The end portion 50 translates longitudinally during operation to cooperate with the workpiece. A tool, such as a spot or projection welding apparatus, a punch, or a die, is secured to the end portion 50 to engage and perform the operation on the workpiece.

As shown in FIGS. 4A-4E and 6A-6F, the working piston 92 separates the working cylinder 36 into an advance working chamber 100 and a retract working chamber 102. The intensification cylinder 38 houses an intensification piston 96 from which an intensification rod 98 extends at least partially into the separator block 44. The intensification piston 96 separates the intensification cylinder 38 into an advance intensification chamber 104 and a retract intensification chamber 106. It should be understood that the pressure cylinder 30 includes various seals, which are not shown, but known in the cylinder art.

As shown in FIGS. 6A-6F, the intensification rod 98 extends through seal 118 and into the separator block 44. When intensification, or amplification of the pressure in the advance working chamber 100 is desired, the intensification rod 98 is advanced through seal 120 to prevent fluid from escaping the advance working chamber 100. At that point, pressure applied to the intensification piston 96 acts upon the smaller diameter of the intensification rod 98 causing it to raise the pressure in the advance working chamber 100, with the pressure increase proportional to the ratio of the areas of the intensification piston 96 and intensification rod 98. Because the volume of fluid displaced by the intensification rod 98 is comparatively small when compared to the volume of the advance working chamber 100, the intensification piston 96 has to stroke a proportionally long distance to cause displacement of the working rod 94.

In situations where the advance stroke of the working rod 94 suddenly becomes unconstrained, such as when the tooling attached to the end portion 50 has completed its function (e.g., piercing or shearing application where the material suddenly yields to the tool), the pressure in advance working chamber 100 will suddenly drop. This eliminates the back pressure acting against the intensification rod 98 and creates the possibility that the intensification piston 96 might lunge forward to the limit of its stroke, with the intensification piston 96 impacting the separator block 44. Enhanced hydraulic positioning control of the intensification piston 96 provides the ability to prevent such impact and also to proceed through the operating sequence as soon as the completion of the process has been detected.

Figure 3:
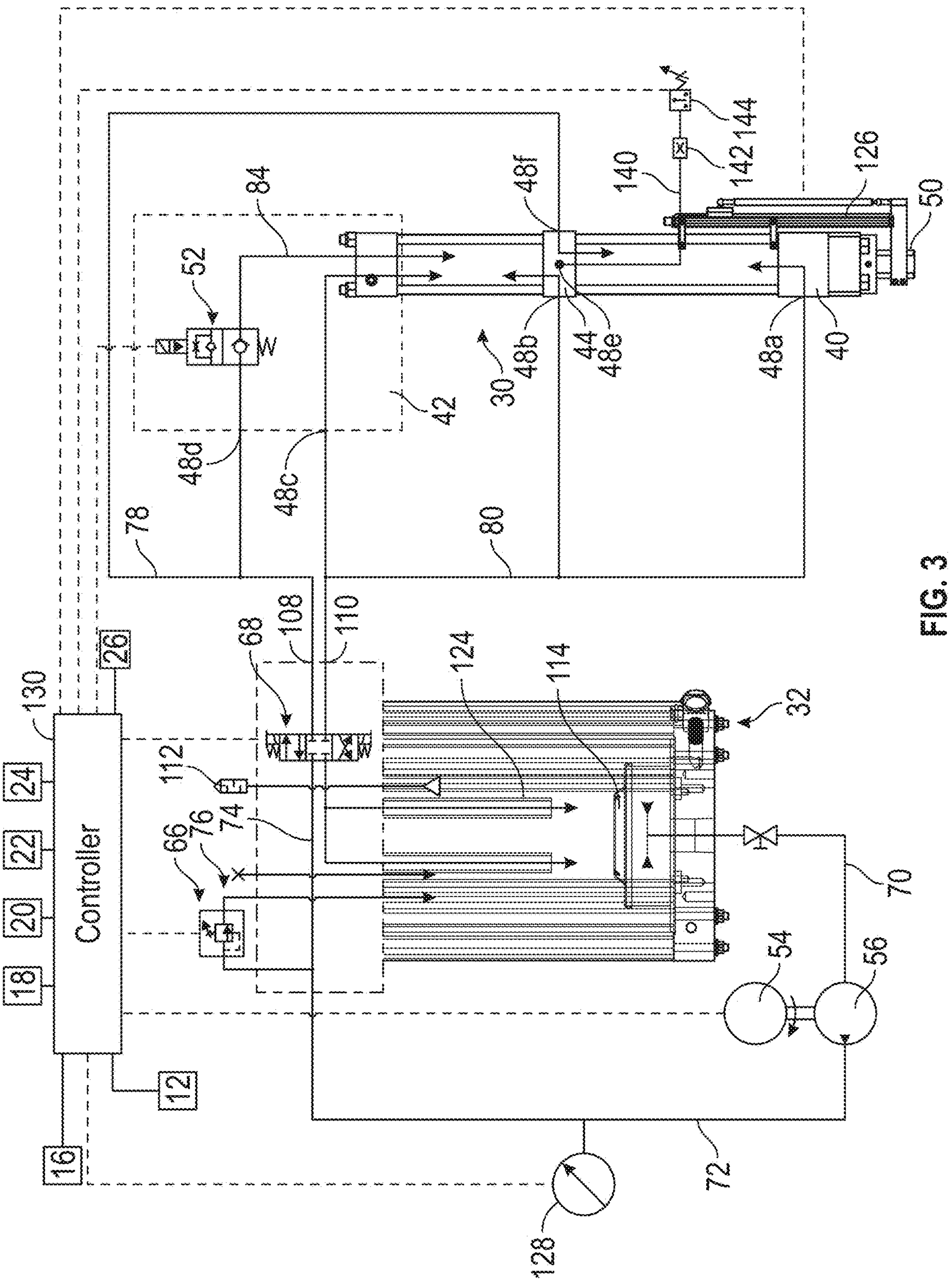
FIG. 3 is a detailed schematic of a hydraulic intensification cylinder system.
Figure 4A:
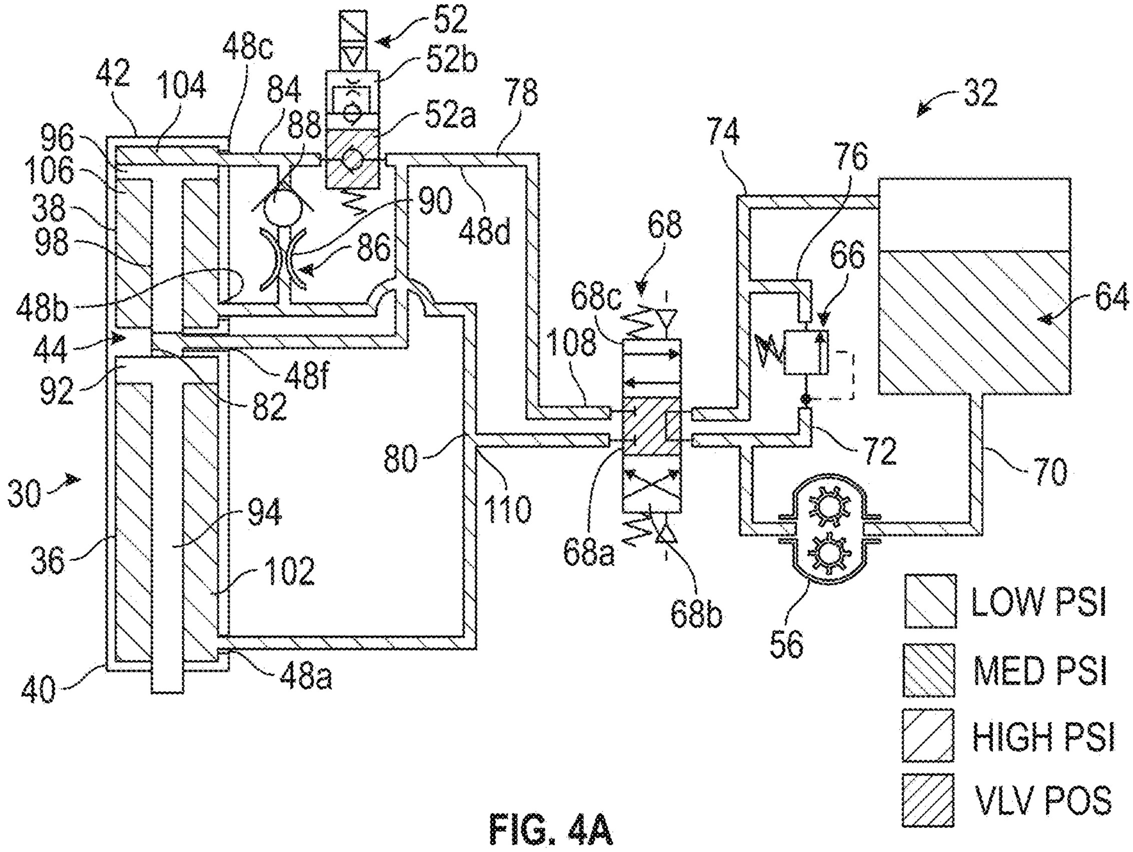
FIGS. 4A-4E are simplified fluid schematics of rest, advancing, advanced, intensified, and retracted states of the system shown in FIGS. 2 and 3.
Figure 4B:
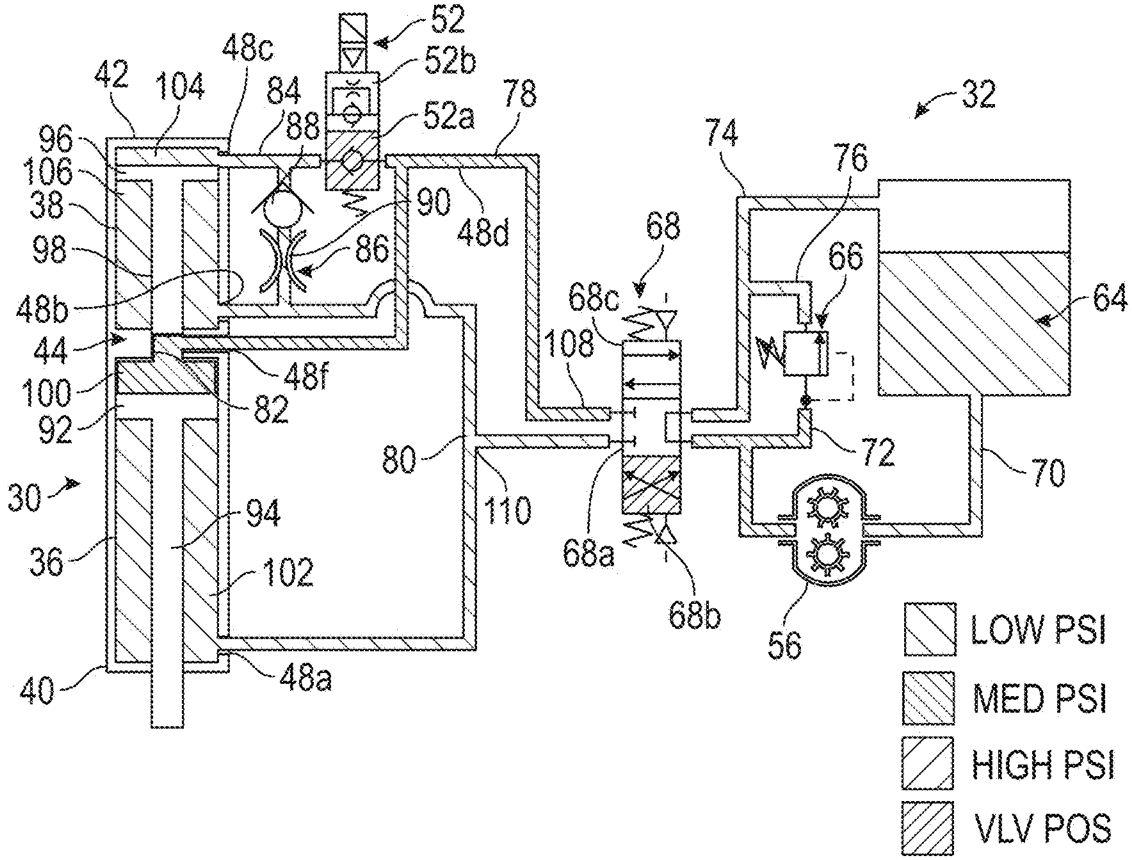
Figure 4C:
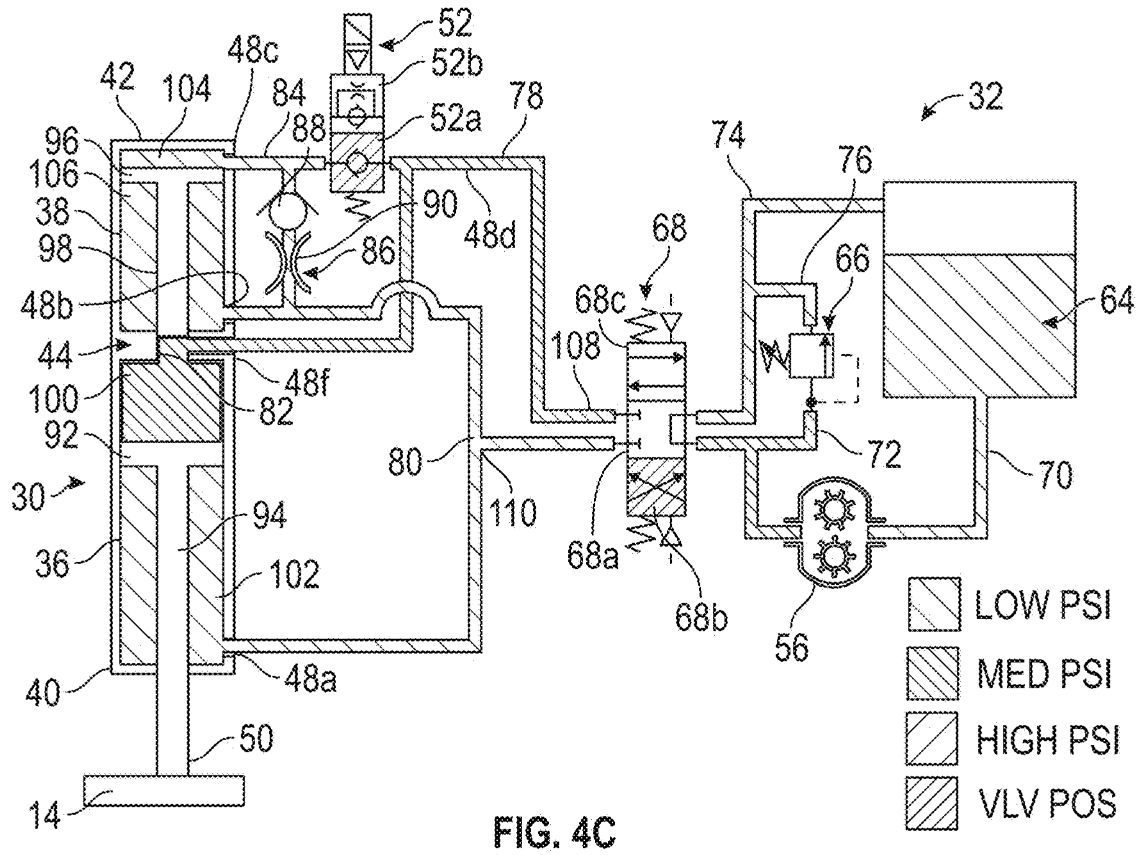
Figure 4D:
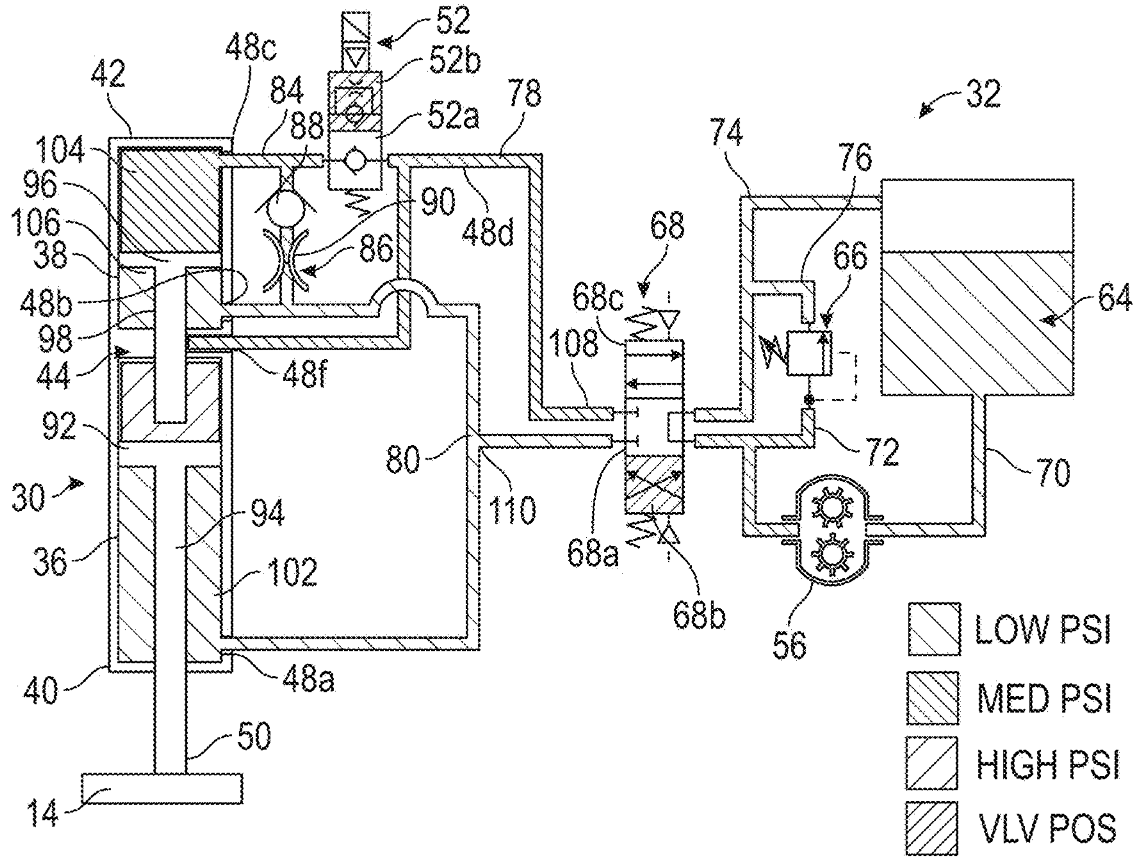
Figure 4E:
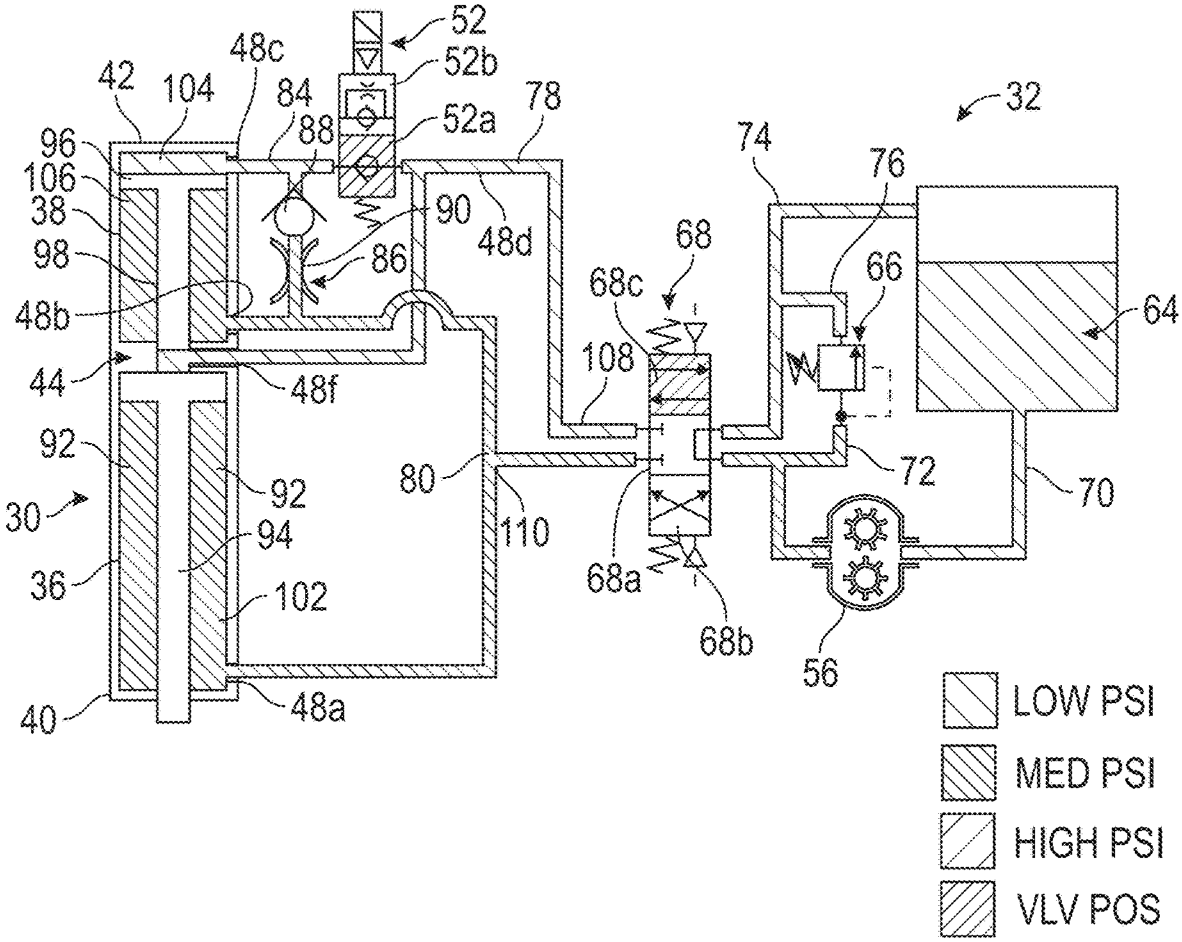

Returning to FIGS. 2 and 3, hydraulic fluid is communicated to the pressure cylinder 30 via ports 48*a*-48*f* (illustrated with hydraulic fittings in place), which are fluidly connected to the pressurized fluid supply assembly 32 as shown in the schematics provided in FIGS. 3-4E. The pressurized fluid supply assembly 32 includes a motor 54 (e.g., servomotor) rotationally driving a pump 56, such as a positive displacement pump. Pump pressure sensing (e.g., pressure sensor 128 in FIG. 3) could be added to minimize the pump run time and hydraulic fluid heating. The pump 56 driven by a servomotor provides more precise control of speed and position. Sensing could be provided to determine cylinder working rod extension or the position of the connected tool (e.g., linear sensor 126 in FIG. 3). The pump pressure can have a wide range of 10 PSI to 300 PSI (or higher depending on the intensification ratio and seal pressure rating) as compared to a system operating from a typical shop air supply, enabling a reduced number of smaller cylinder bore sizes. An electric motor driven pump facilitates the control of position, speed and force. The system, with incompressible fluid, quickly and effectively blocks motion when power is removed, unlike a pneumatic cylinder which may be pulled from the returned position by gravity or move suddenly when compressed air is exhausted. The fail-safe control system with lockout capability is much less complicated to implement than one powered by compressed air since there are fewer components and potential failure modes. It is only necessary to remove electrical power to the motor 54.

FIG. 3 and FIGS. 8-9E (omitted from FIGS. 4A-4E for simplicity) illustrates a pressure sensor 144 and orifice 142. The high-pressure sensor 144 directly monitors the hydraulic pressure in the advance working chamber 100 via an advance working chamber passageway 140 connected to a bleeder port 48*e* in the middle separator block 44. The purpose of the high-pressure sensor 144 is to provide precise measurement of hydraulic pressure in advance working chamber 100 to enable controller 130, to precisely monitor and control the pressure cylinder 30 output force. The high-pressure sensor 144 facilitates closed-loop servo control of motor 54, which is used to drive the pump 56. The controller 130 will command the motor 54 to reduce its torque above a first pressure threshold and command the motor 54 to increase its torque below a second pressure threshold. In this manner, the pump 56 automatically provides hydraulic fluid to the pressure cylinder 30 at a desired pressure for desired operation in response to the signal from the high-pressure sensor 144.

The fixed orifice 142 optionally is provided in the advance working chamber passageway 140 to limit the discharge of hydraulic fluid in the event of some forms of catastrophic sensor failure. Fixed orifice 142 may function as a snubber if the sensor 144 permits significant hydraulic fluid flow. This would be to dampen hydraulic force transients for the protection of sensor 144. Orifice 142 is large enough to ensure it will not dampen the force sensing performance of sensor 144. The sensor 144 may be any type of analog or digital sensor capable of measuring high-pressure hydraulic forces. It could also be a simple switch with a single setpoint, as long as precision control over the operation is achieved.

Figure 5C:
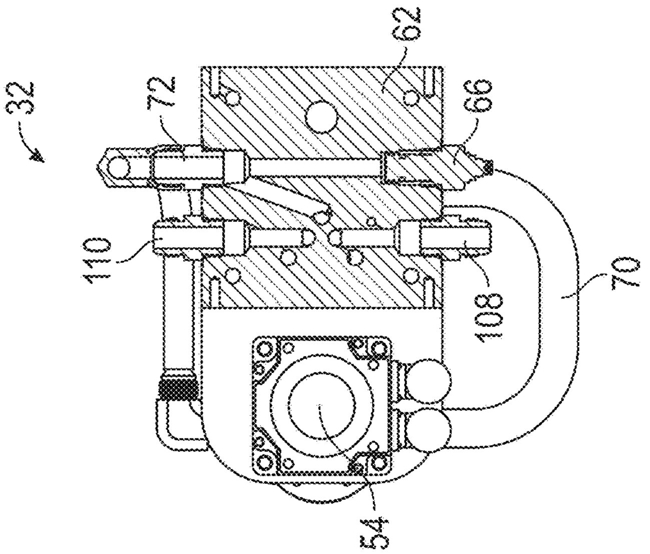
FIGS. 5B and 5C are respectively cross-sectional views taken along lines 5B-5B and 5C-5C in FIG. 5A.
Figure 5B:
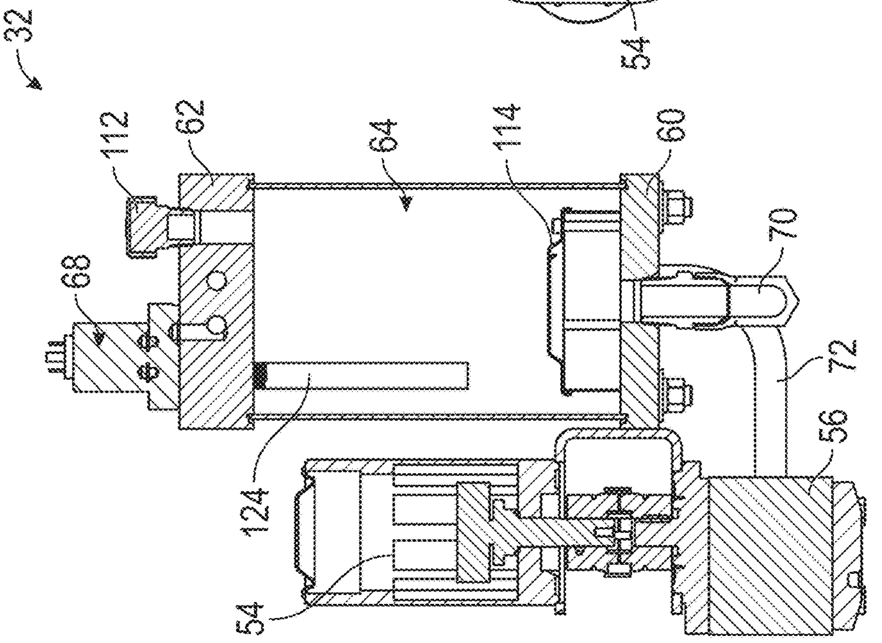
Figure 5A:
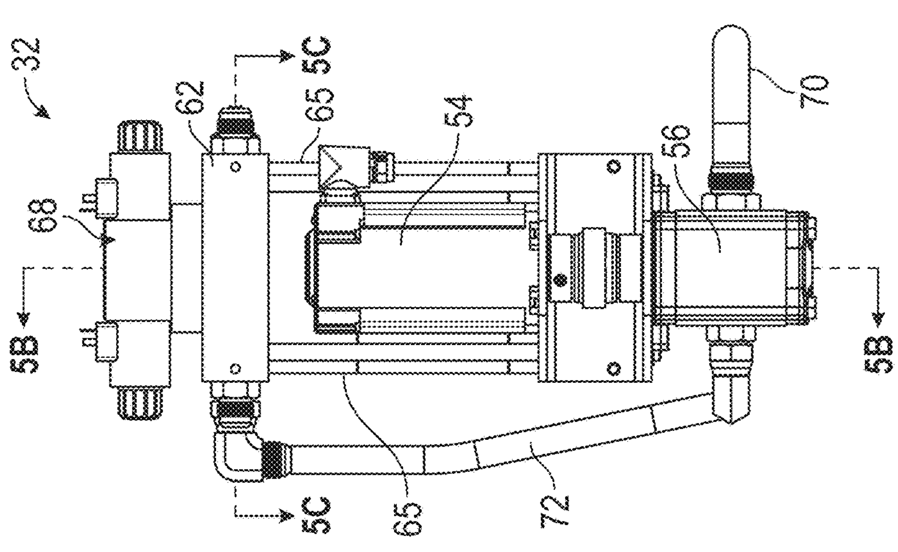
FIG. 5A is a front view of the pressurized fluid supply assembly shown in FIG. 2.

The motor 54 and the pump 56 are mounted on a common bracket 58 that is secured to a first plate 60, shown in FIG. 2. A hydraulic fluid reservoir 64 is arranged between the first plate 60 and a second plate 62 secured to one another by fasteners 65. A relief valve 66 and a first valve (e.g., 4-way 3-position valve) 68 are supported on the second plate 62, which may include one or more internal passageways in the plate, as shown in FIGS. 5A-5C. The first valve 68 is configured to selectively regulate hydraulic fluid flow between the working cylinder 36 or the intensification cylinder 38 and the fluid reservoir 32 and the pump 56.

Within the hydraulic fluid reservoir 64, a baffle 114 is attached to the first plate 60 to cause fluid returning from the pump 56 to be redirected and diffused into the fluid within the reservoir. Similarly, a return extension 124 is connected to the second plate 62 to direct fluid returning through the first valve 68 so it will discharge below the surface of the hydraulic fluid in the reservoir. Baffle 114 and return extension 124 prevent the aeration of the hydraulic fluid, and the performance degradation that would result from entraining air in the otherwise incompressible hydraulic fluid. Examples are cavitation within the pump 56 and a reduction of the intensification efficiency in the pressure cylinder 30.

The disclosed system is filled with hydraulic fluid (i.e., oil), which enables the reservoir 64 to be smaller than a conventional intensification cylinder reservoir where sufficient additional hydraulic fluid must be provided as air is pushed out of the cylinder as the working piston advances. The reservoir 64 provides some extra make-up fluid, venting of entrained air released from the hydraulic fluid or system (e.g., via a breather 112), and may provide visibility of the fluid level and condition (e.g., clarity and color). These features improve the operational efficiency when entrained air and contamination are introduced to the system through poor maintenance procedures. The reservoir 64 is designed to passively cool the fluid, which is heated during compression. The reservoir 64, for example, may be constructed of aluminum with fins to increase the area for dissipating heat. The reservoir 64 also accommodates the transfer of hydraulic fluid from one side of a cylinder piston to the other, without requiring any supplemental methods (e.g., bladders, spring-loaded follower) to account for the volume differences that arise from the fact the pressurized area is different on each side of the piston.

With continuing reference to FIGS. 2 and 4A-4E, a supply passage 70 fluidly connects the fluid reservoir 64 to the pump 56 on the supply side of the pump 56. A pressurized fluid passage 72 fluidly connects a pressure side of the pump 56 to the first valve 68. A return passage 74 fluidly connects the first valve 68 to the fluid reservoir 64. In one example, a pressure relief circuit 76, which may be provide in the second plate 62 of the fluid reservoir 64, fluidly interconnects the pressurized fluid passage to the return passage 74 that fluidly interconnects the first valve 68 to the fluid reservoir 64. The pressure relief circuit 76 is configured to normally block fluid flow with a pressure relief valve 66 from the pressurized fluid passage 72 to the return passage 74 but permit fluid flow from the pressurized fluid passage 72 to the return passage 74 above a predetermined pressure threshold. The pressure relief valve 66 is provided as a safety device so the system cannot be over-pressurized to a value that will exceed the operating limit rating of the cylinder, the machine or gun frame, tooling, or the workpiece. In a less sophisticated control regime, this pressure relief valve could serve as an active control element, and used to determine the required working pressure.

An advance passage 78 fluidly connects an advance port 108 (FIGS. 4A-4E and 5C) in communication with the first valve 68 to the advance working chamber 100 via port 48*f*. Ports 48*a*, 48*b* are in fluid communication respectively with the retract working chamber 102, and the retract intensification chamber 106.

The first valve 68 includes a first position 68*a* configured to fluidly connect the pressurized fluid passage 72 to the return passage 74. A second position 68*b* is configured to fluidly connect the pressured fluid passage 72 to the advance passage 78, and to fluidly connect a retract passage 80 to the return passage 74. A third position 68*c* is configured to fluidly connect the advance passage 78 to the relief passage, and to fluidly connect the pressurized fluid passage to the retract passage.

In the example, a directional control valve (i.e., second valve) 52, is mounted to the second end block 42 of the pressure cylinder 30. The second valve/directional control valve 52 is configured to selectively regulate fluid flow between first valve 68 and the advance intensification chamber 104. An intensification passage 84 fluidly connects the directional valve 52 to the advance intensification chamber 104. The directional valve 52 includes a first position **52*a* fluidly blocking fluid flow from the advance passage 78 to the advance intensification chamber 104, and a second position 52*b* fluidly connecting the advance passage 78 to the advance intensification chamber 104. When the intensification rod 98 is retracted, the working rod 94 of pressure cylinder 30 may be stopped in any position by coordinating the first valve 68 and the pump 56. When the desired working rod 94 position has been achieved, the first valve 68 can be returned to its first position 68*a*, which would stop hydraulic fluid returning to the fluid reservoir 64. With the hydraulic fluid blocked by the first valve 68, the motor 54 and pump 56 would not need to be operated to maintain the working rod 94** position. This greatly reduces the proliferation of cylinder variations in a manufacturing facility because conventional air cylinders are mechanically configured to provide a specific combination of working stroke and retract stroke.

A retract passage 80 fluidly connects a retract port 110 from the first valve 68 to the retract working chamber 102 and retract intensification chamber 106 respectively via ports **48*a*, 48*b*. An equalization circuit 86, mounted to the pressure cylinder 30, is fluidly connected between the intensification passage 84 and the retract passage 80. In the example, port 48*c* is provided at the junction between the equalization circuit 86 and the retract passage 80, and port 48*d* is provided in the advanced passage upstream from the directional valve 52. The equalization circuit 86 includes a check valve 88 configured to block fluid flow from the retract passage 80 to the intensification passage 84 but permit fluid flow from the intensification passage 84 to the retract passage via a flow metering orifice 90. The orifice 90 is active when the second valve 52 is open, to provide some return pressure against both working and intensifying pistons 92, 96 to prevent piston drift. The orifice 90 also provides a bypass for the fluid applied to the intensification piston 92** to establish a relationship between pump speed and intensification pressure.

A controller 130 (FIG. 3) is in communication with the first valve 68 and the second valve 52. The controller 130 is configured to coordinate movement of the working piston 92 and the intensification piston 96 between a rest state (FIG. 4A), an advancing state (FIG. 4B), an advanced state (FIG. 4C), an intensified state (FIG. 4D), and a retracted state (FIG. 4E). The advanced state is configured to engage the end portion 50, with its tool (not shown), with the workpiece. The intensified state is configured to perform an operation on the workpiece with the end portion 50 and tool.

With reference to FIG. 3, the controller 130 may communicate with a position sensor 126 (e.g., LVDT) to monitor a longitudinal position of the end portion 50 to provide capability for analysis and verification of a process signature, such as a force-displacement or velocity-displacement profile. The controller 130 can selectively use a variety of input signals to control operation. For example, the position sensor 126 can provide position feedback during the advance stroke. Some examples, include providing precise control from the signal generated during the collapse of a resistance weld projection (e.g., U.S. Pat. No. 7,564,005 entitled "RESISTANCE WELDING FASTENER AND MONITOR AND METHOD OF USING SAME", issued Jul. 21, 2009, and incorporated herein by reference in its entirety), piercing of a hole, or completion of a clinch (e.g., U.S. Provisional Patent Application No. 63/425,447 entitled "SELF-PIERCING CLINCH FASTENER INSTALLATION PRESS", filed Nov. 15, 2022, and incorporated herein by reference in its entirety).

The controller 130 may also communicate with a pressure sensor 128 that is in fluid communication with the pressurized fluid passage 72. The controller 130 is configured to monitor a pressure within the pressurized fluid passage corresponding to an operational state of the system, for example, by sensing contact and verifying the operating pressure, and to associate pressure values with the position feedback. The fluid pressure sensor 128 can be used to identify unusual pressure decay during the rest state indicative of system leakage, including early detection of cylinder seal deterioration; if the pump 56 should be cycled periodically (a maintenance cycle) to remove excessive entrained air from the hydraulic fluid; if the fluid reservoir 64 has insufficient hydraulic fluid; unexpected pressure during the advance stroke indicating an obstacle has been encountered; the moment the tool has engaged the workpiece and the quality of contact or workpiece stability; the moment the tool has completed its task, since the pressure may build to indicate motion has ceased, or dropped to indicate the task (e.g., piercing a hole) has been completed; the moment an event has occurred, so cycle time may be optimized by immediately advancing to the next phase of the operating sequence; a detailed and sensitive process signature considering that the ratio of the intensification rod 98 and working piston 92 will proportionally amplify pressure changes at the working rod 94 for the pressure sensor, which is very useful for processes where pressure is a useful indicator of process quality such as metal forming, press-fit assembly, and broaching; excessive return force indicating the tooling has not disengaged from the workpiece; and/or unexpected pressure during the return stroke indicating an obstacle has been encountered.

Other aspects of operation of the cell 10 may be coordinated by the controller 130, such as movement of the robot 16, various aspects of the first and second work stations 18, 22, and operation of the first and second feeders 20, 24 and of the first and second conveyors 12, 26.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 130 may be a hardware device for executing software, particularly software stored in memory. The controller 130 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 130 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 6A:
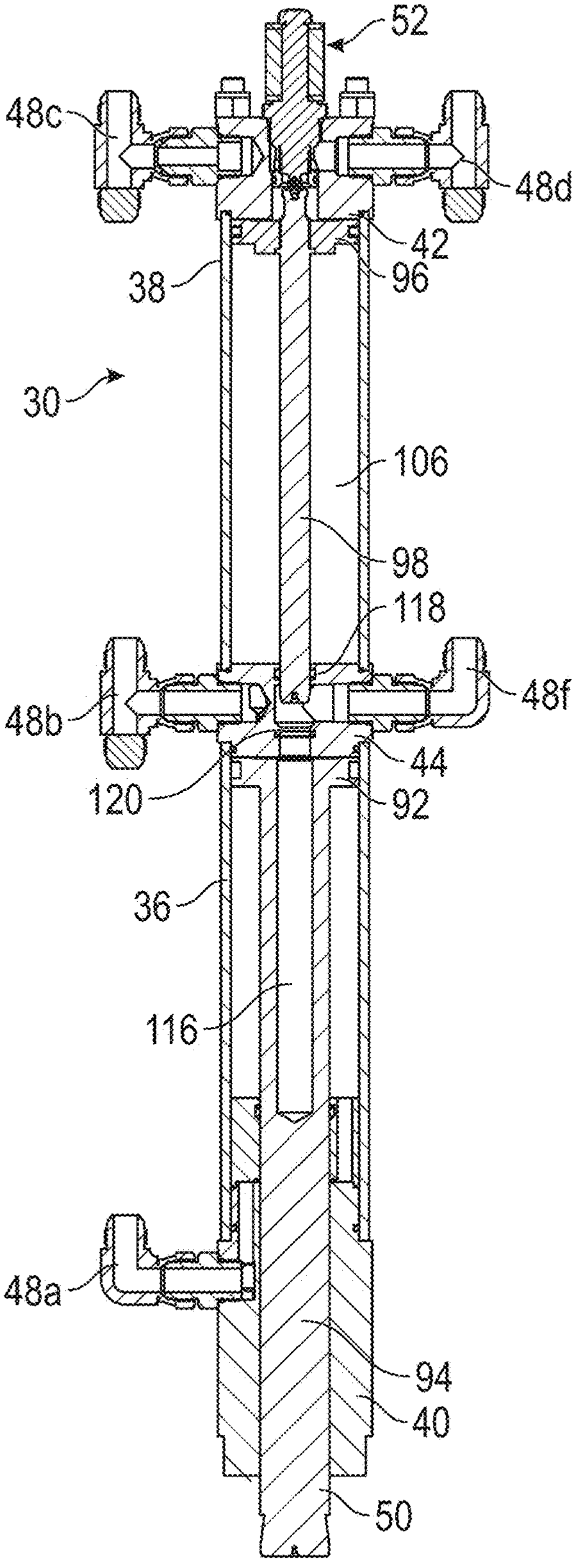
FIGS. 6A-6F are cross-sectional views of the hydraulic intensification cylinder shown in FIG. 2 respectively illustrating retracted, advanced, intensified, high pressure stroke to complete work, return intensification piston to port open, and retracted positions, respectively.
Figure 6B:
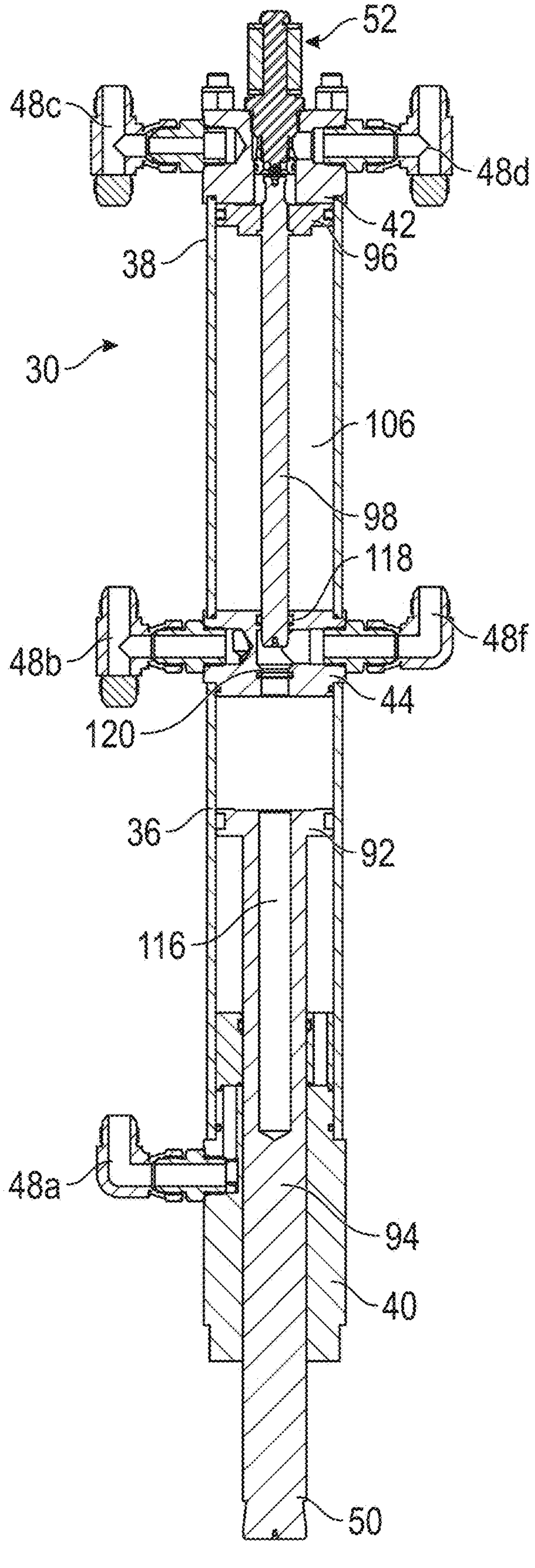
Figure 6C:
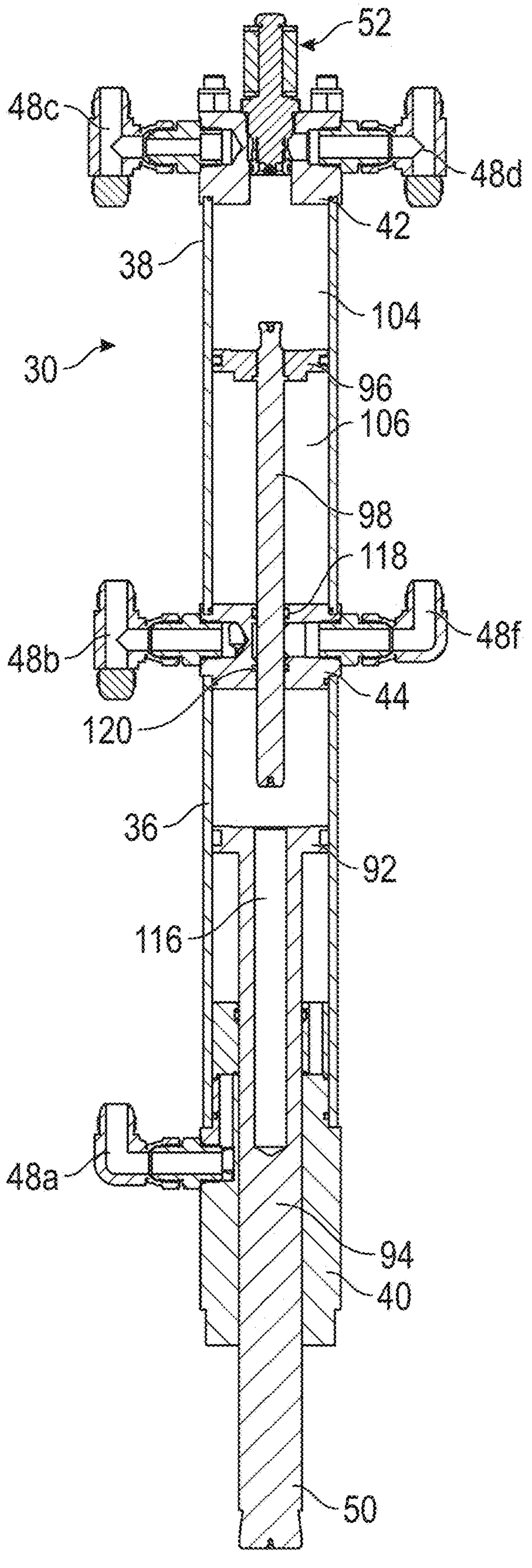
Figure 6D:
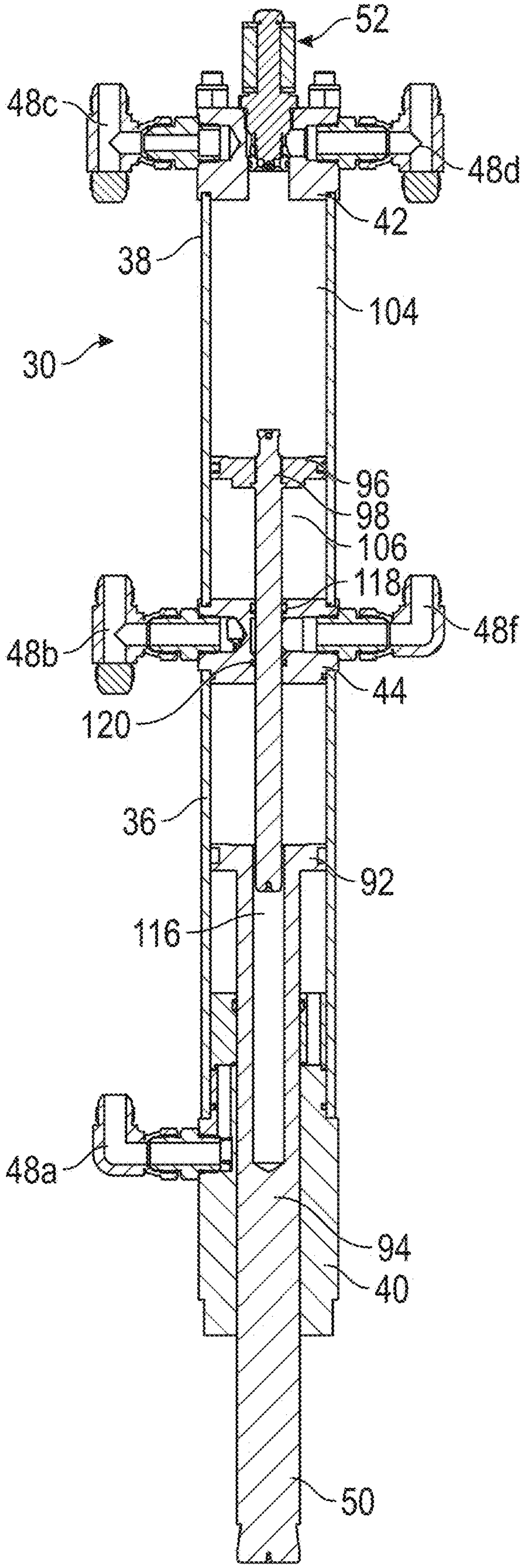
Figure 6E:
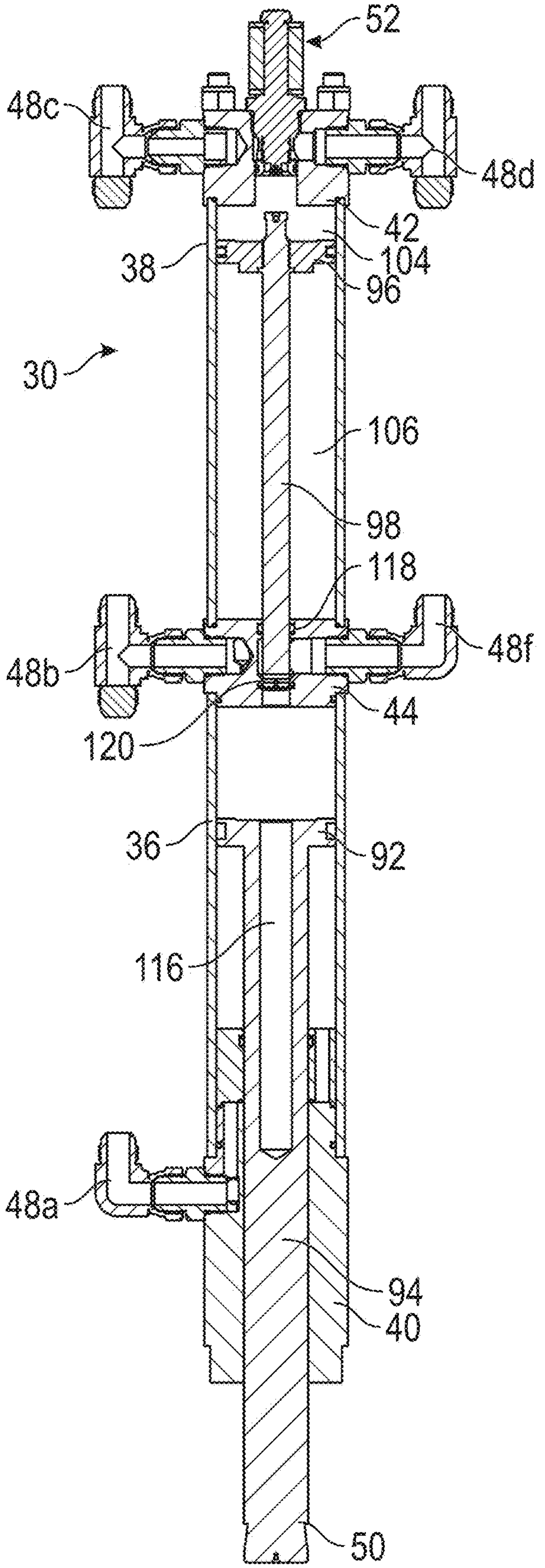
Figure 6F:
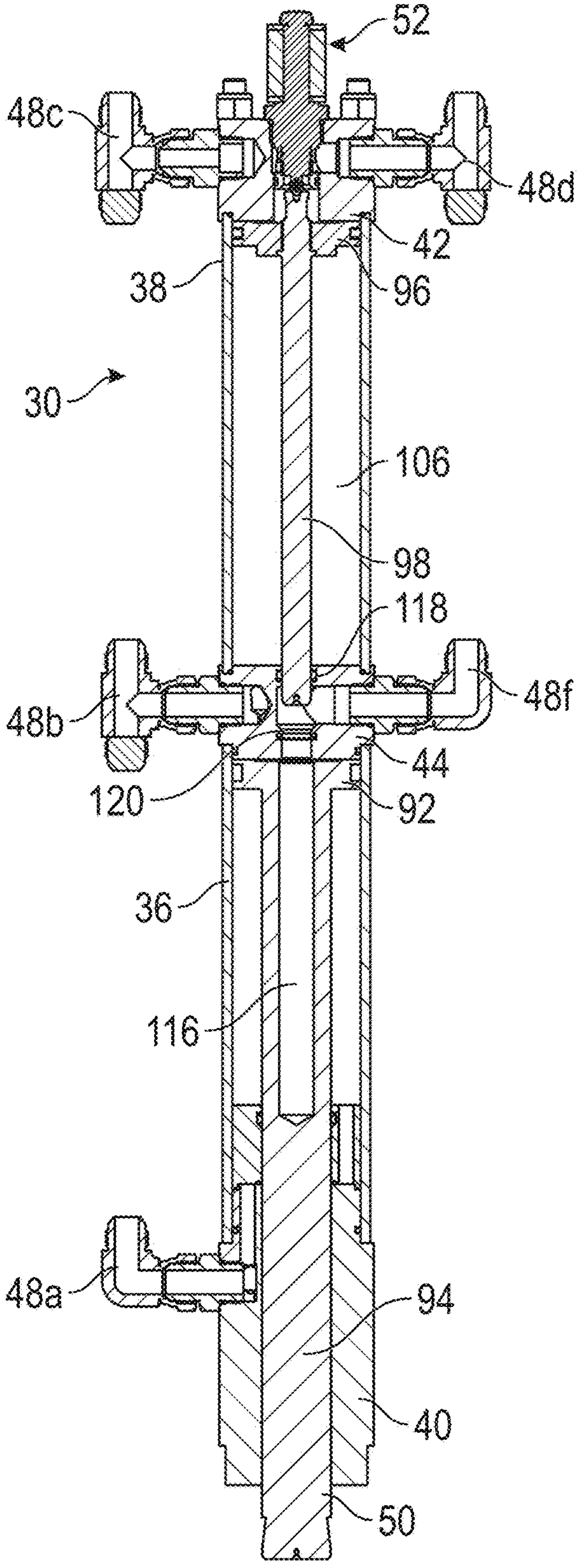

Referring to FIGS. 4A, 6A and 6F, the system is illustrated in a rest state, in which the working piston 92 and an intensification piston 96 are in the retracted positions. In this state, the first valve 68 is in a first position 68*a*, which fluidly connects the pressurized fluid passage 72 to the return passage 74. The directional valve 52 is in a first position 52*a*.

To actuate the pressure cylinder 30 to an advancing state (FIGS. 4B and 6B), the first valve 68 is moved to a second position 68*b* in which the pressurized fluid passage 72 is fluidly connected to the advance passage 78, and the retract passage 80 is fluidly connected to the return passage 74. Pressurized fluid flows from the pump 56 and pressurized fluid passage 72 to advance passage 78 via the first valve 68 in its second position 68*b* to provide pressurized fluid to the advance working chamber 100, which advances the working piston 92 and its working rod 94 toward the workpiece 14 until the end portion 50 and its supported tool engages the workpiece 14, as shown in FIG. 4C.

At this point, the directional valve 52 is actuated to a second position 52*b*, which enables pressurized fluid flow from the advanced passage 78 to the advance intensification chamber 104 via the intensification passage 84. The separator block 44 includes a bore 82 in which the intensification rod 98 is supported by and at least partially arranged. The port 48*f* fluidly connects the advance passage 78 to the bore 82.

As the intensification rod 98 advances through the bore 82 in the separator block 44 and passes through seal 120 (FIG. 4C), flow from the advanced passage 78 is prevented from further flow into the advance working chamber 100. As the intensification rod 98 continues to advance into the advance working chamber 100 to the intensified state (FIGS. 4D and 6C), the force across the working piston 92 and thus the working rod 94 significantly increases on the workpiece 14. If desired, the working piston 92 (and, optionally, working rod 94) include a hole 116 configured to receive the intensification rod 98 in the intensified state (FIG. 6D).

Once the operation is completed, the intensification piston 96 and its respective intensification rod 98 are moved to a position where the intensification rod 98 no longer penetrates seal 120. At that point, advance working chamber 100 is once again connected to advanced passage 78, permitting the fluid in retract working chamber 102 to push against working piston 92 to force the fluid from the advance working chamber 100, back through the advance passage 78 and return passage 74. As shown in FIG. 4E, the first valve 68 is moved to a third position 68*c* in which the advance working chamber 100 and advance intensification chamber 104 are exhausted through the first position 52*a* of the directional valve 52, through the advanced passage 78, through the third position 68*c* of the first valve 68, into the return passage 74 and back to the fluid reservoir 64. At the same time, a pressurized fluid from the pressurized fluid passage 72 is supplied through the third position 68*c* of the first valve 68 to the retract passage 80 and into the retract working chamber 102 and retract intensification chamber 106, which are at higher relative pressures than the advance working chamber 100 and the advance intensification chamber 104.

Figure 7:
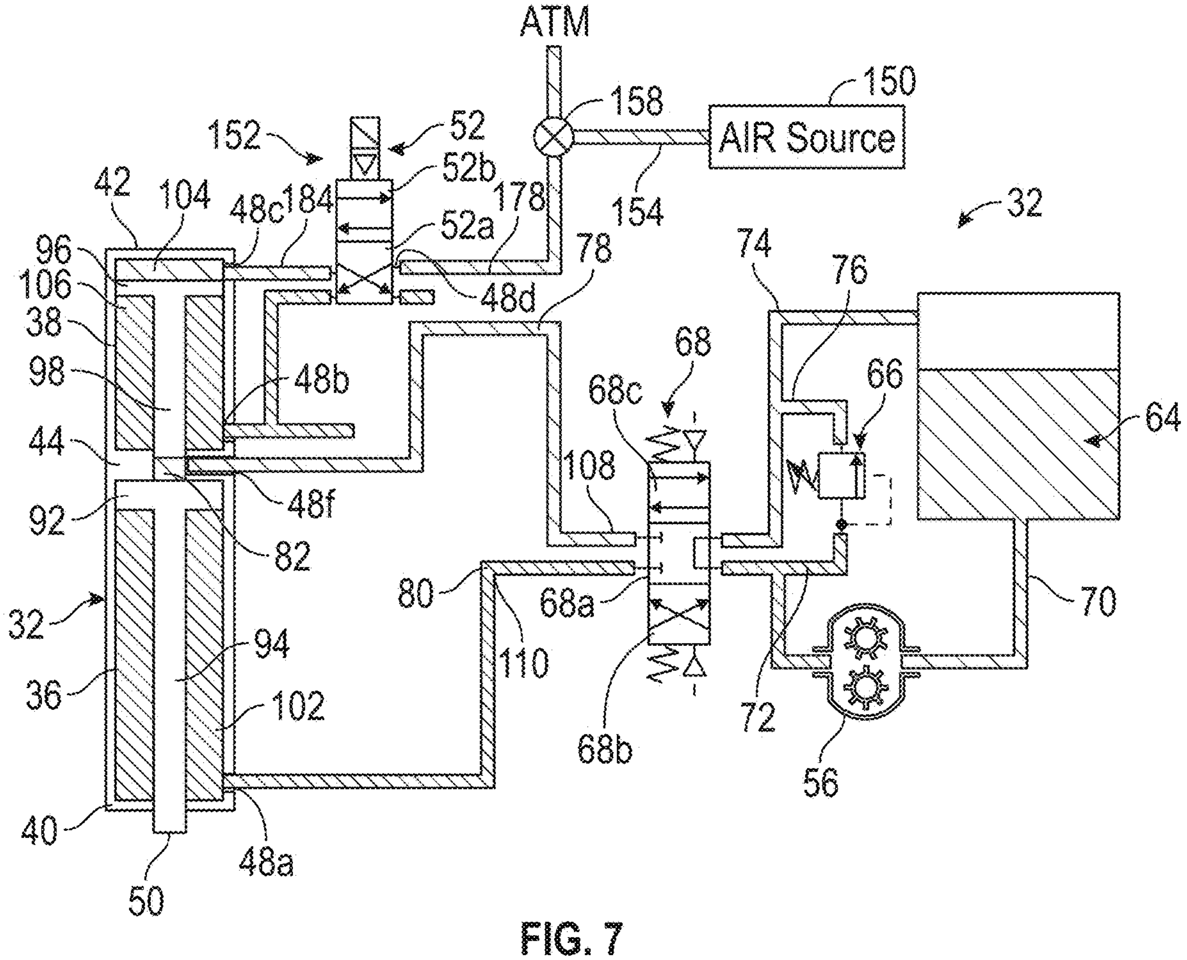
FIG. 7 illustrates a fluid schematic in which a pneumatic intensification feature is employed.

Referring to FIG. 7, the intensification function can be operated using compressed air instead of hydraulic fluid for applications where the compressibility and viscosity of air provide desirable performance characteristics. In one example, a regulated air source 150 is fluidly connected to a 4-way 2-position second valve 152 by an isolation valve 158 via a supply passage 154 and an advance passage 178. The at-rest second valve 152 is configured to provide air to 48*b*, retaining the intensification piston 98 in the retracted position. After the working rod 94 has advanced to the work position, the second valve 152 is operated, to provide pressurized air to the advance intensification chamber 104 via an intensification passage 184. In this method of operation, the low viscosity and compressibility of air may provide useful dynamic response for applications where it is beneficial to respond to variations in the load force (e.g., in welding applications where thermal expansion and workpiece upset could cause sudden changes in pressure). In this case, operation of the intensification cylinder 36 is similar to the prior art so it is easy to explain and execute. Operation of the intensification cylinder 38 with air does not diminish the advantage of operating the pressure cylinder 30 using the pressurized hydraulic fluid supply assembly 32. Hydraulic operation of the pressure cylinder 30 facilitates positive and accurate control over the working rod 94 position, employs hydraulic fluid on both sides of the working piston 92 seals to minimize the effects of any seal leakage, and retains the capability to achieve higher values of retract force.

The system in FIG. 7 also includes the advance working chamber passageway 140, orifice 142 and pressure sensor 144, as shown in FIG. 3 and described above. These elements are omitted from FIG. 7 for simplicity.

Figure 8:
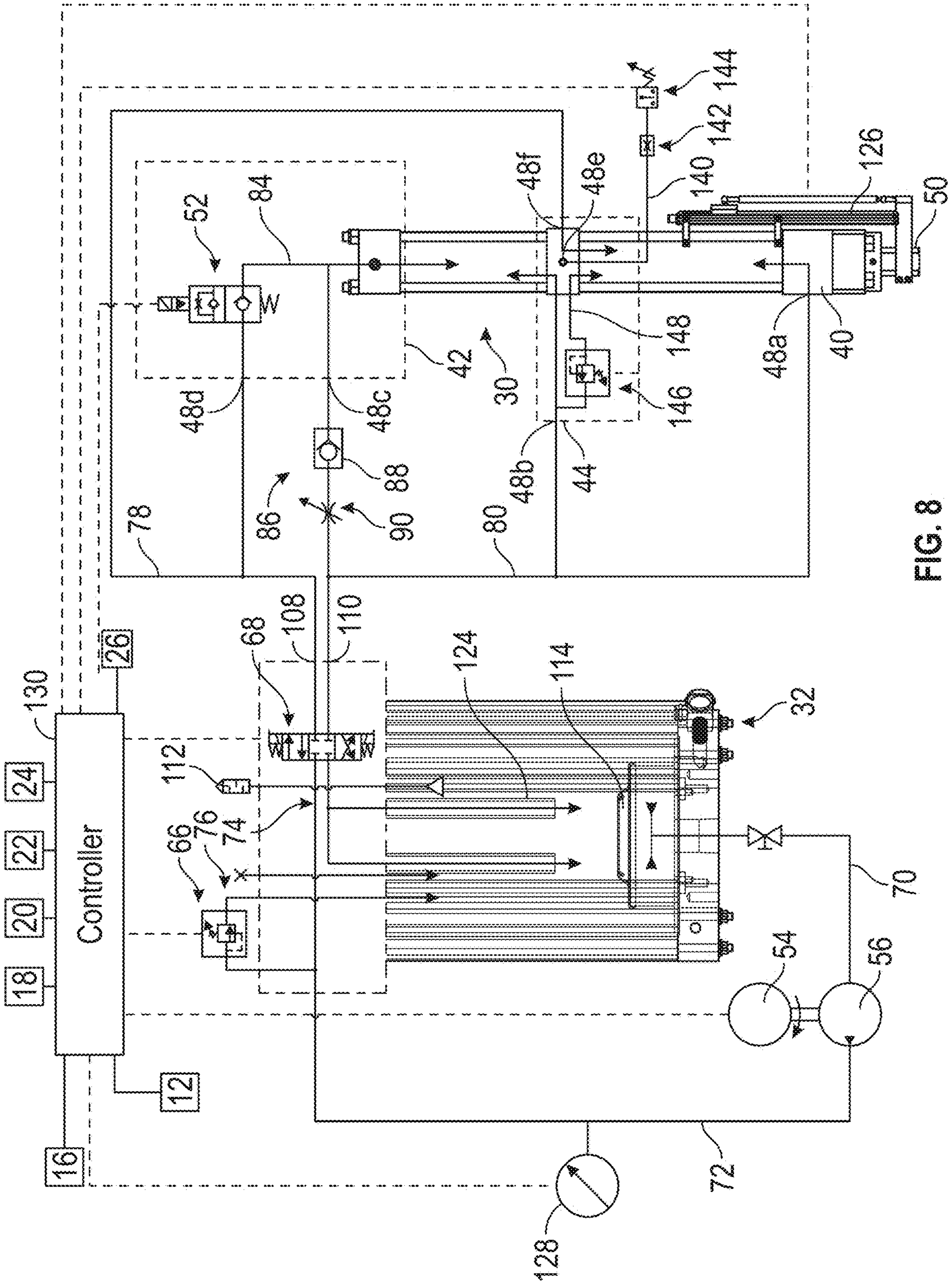
FIG. 8 is a detailed schematic of another hydraulic intensification cylinder system.
Figure 9A:
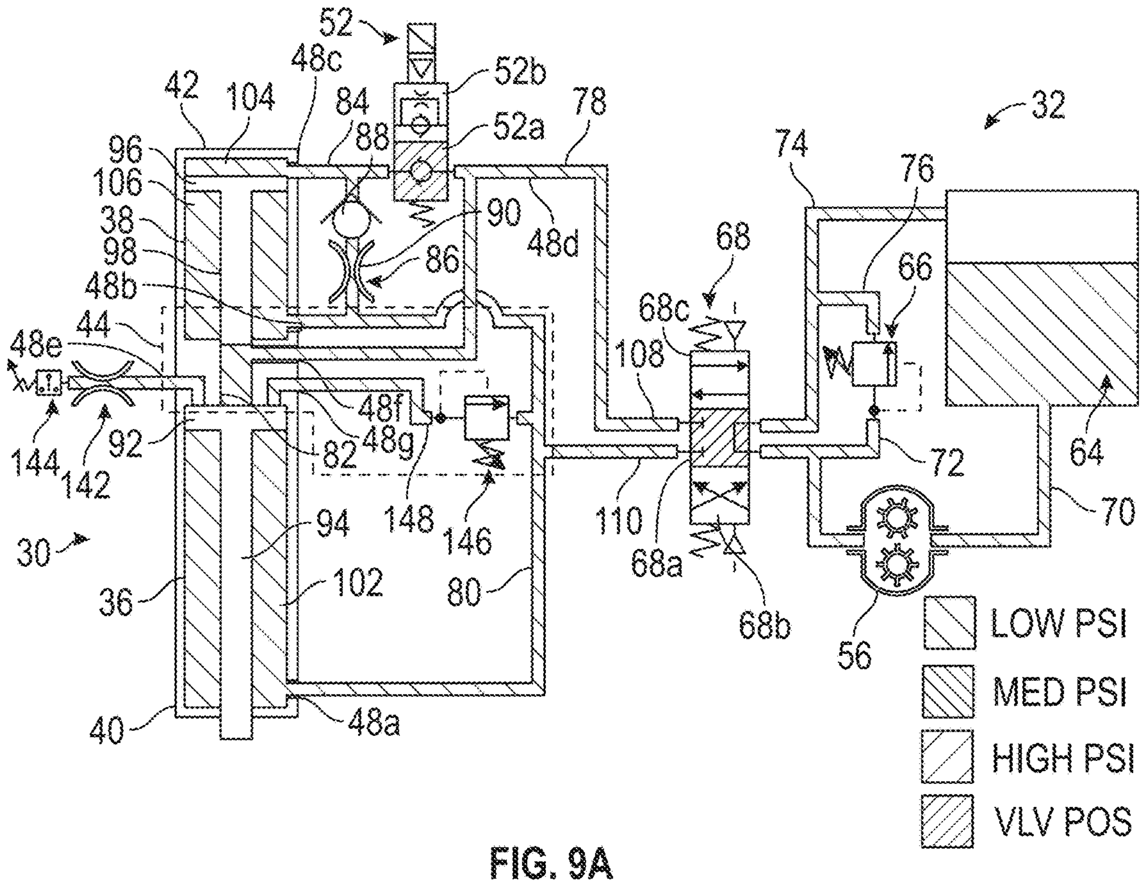
FIGS. 9A-9E are simplified fluid schematics of rest, advancing, advanced, intensified, and retracted states of the system shown in FIG. 8.
Figure 9B:
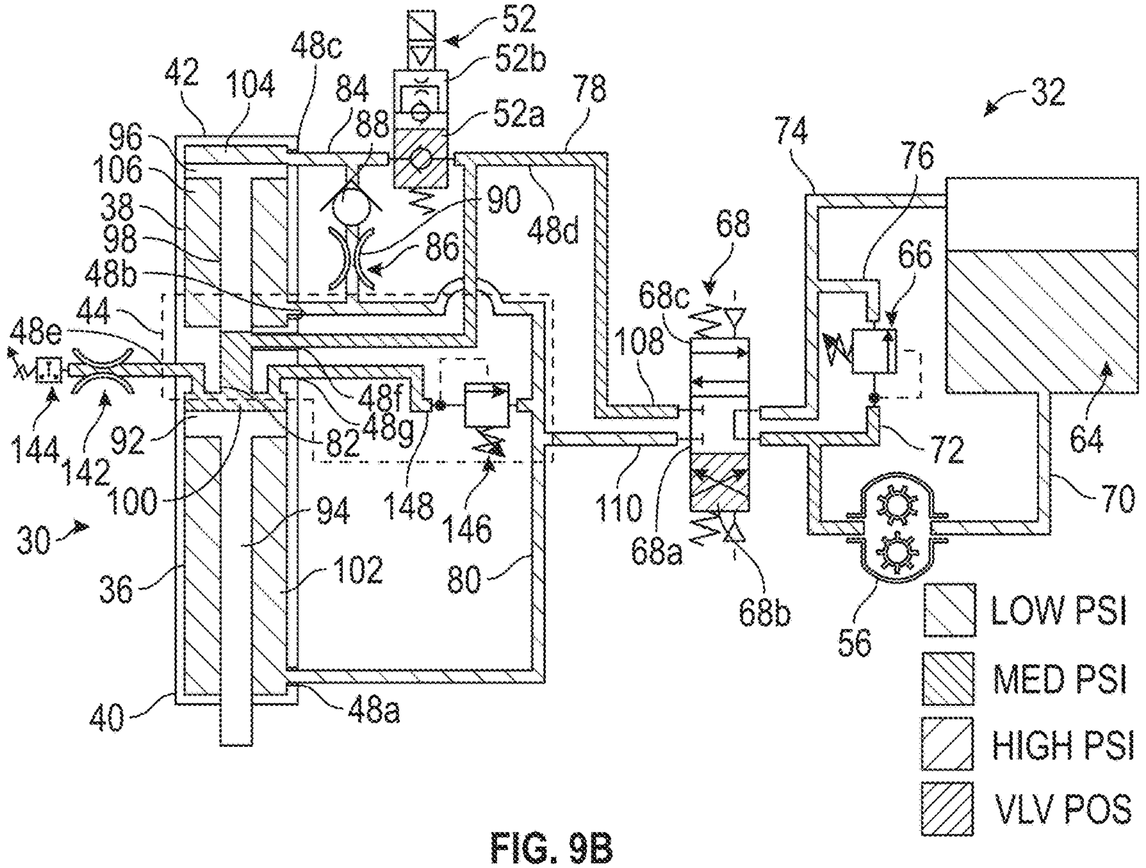
Figure 9C:
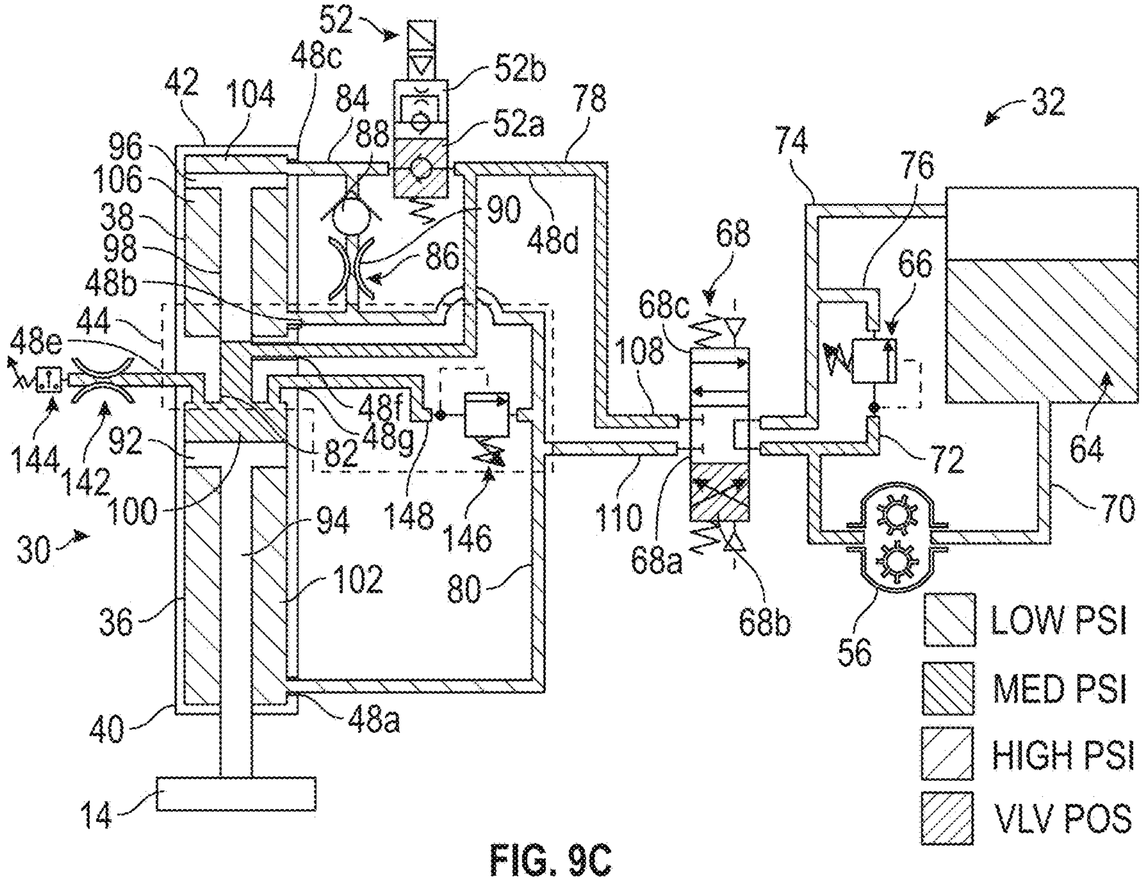
Figure 9D:
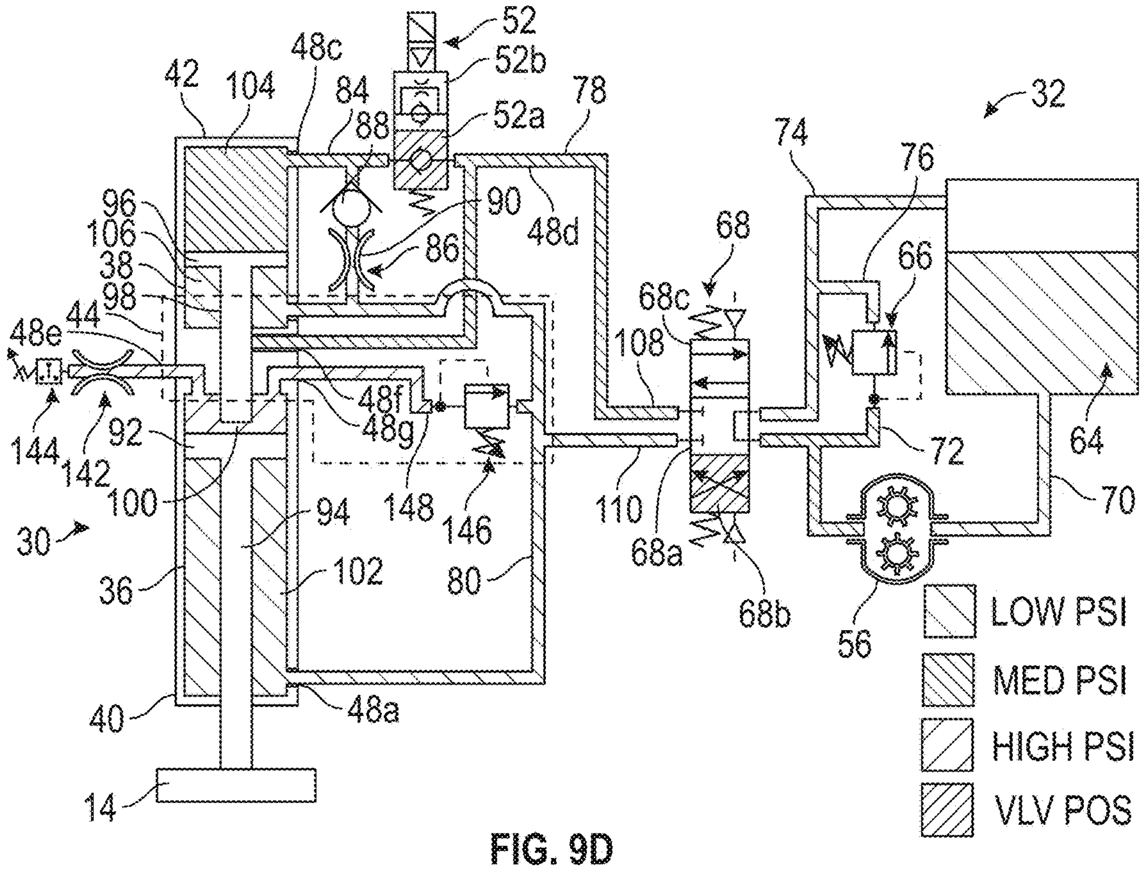
Figure 9E:
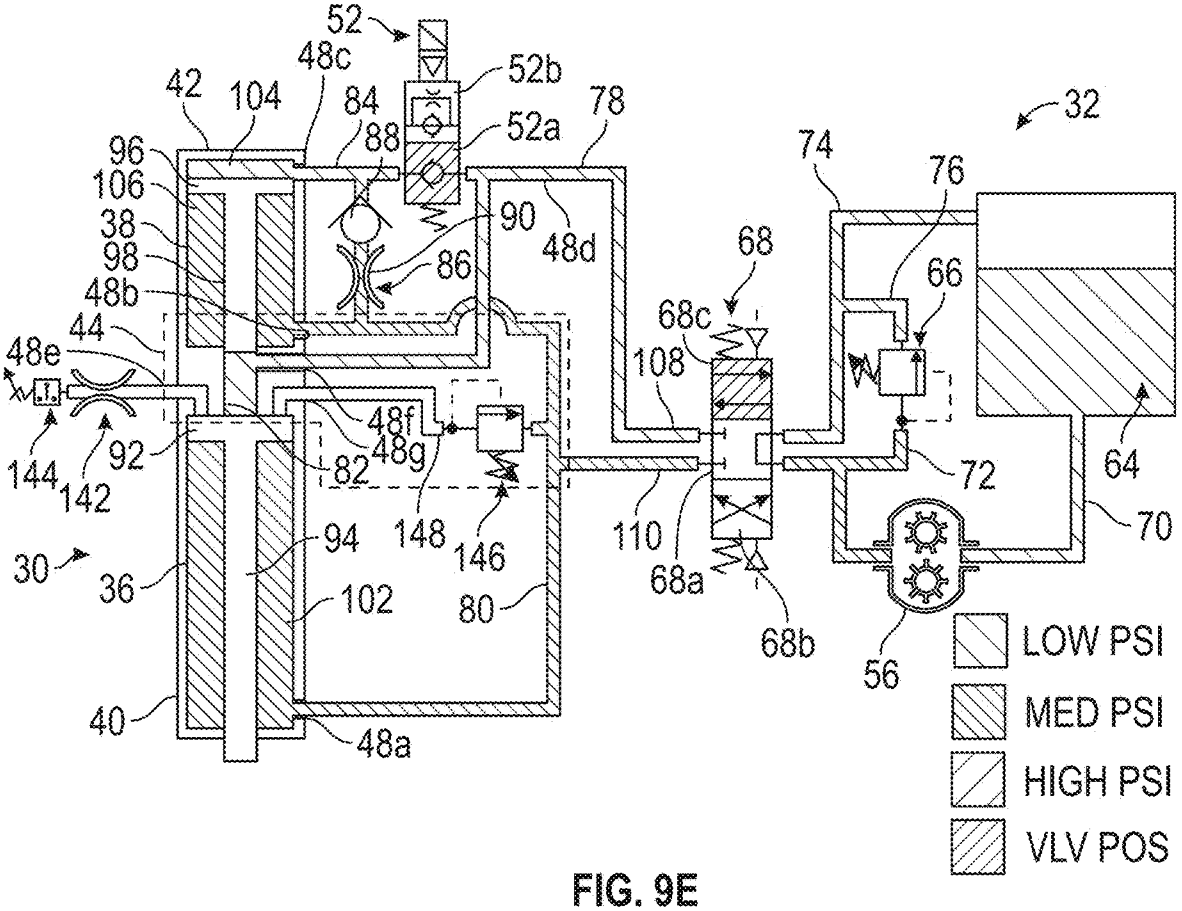

Another embodiment is shown in FIGS. 8-9E in which a pressure relief valve 146 is in communication with the middle separator block 44 via a working pressure monitoring port 48*g*. An overpressure circuit 148 is in fluid communication with the working pressure monitoring port 48*g* (not shown in FIG. 2) and the retract passage 80. The pressure relief valve 146 may be located within the middle separator block 44, or externally. Bleeder port 48*e* and working pressure monitoring port 48*g* may be provided separately or combined into a single port in middle separator block 44 that provides for fluid pressure monitoring within advance working chamber 100. The arrangement shown in FIGS. 8-9E operates in a manner similar to that described above with respect to FIGS. 3-4E.

With continuing reference to FIGS. 8-9E, in the event pressure in the advance working chamber 100 rises to a level that puts the hydraulic seals at risk of failure (e.g., seals on working piston 92), the pressure relief valve 146 will open and release excess pressure within advance working chamber 100 into the retract passage 80. The most likely reason that such an overpressure condition may occur would be a programming or setup error. Overpressure could also occur in situations where there is an external force applied to the end portion 50 of working rod 94. Such an external force might, for example, be from a cooperating opposing pressure cylinder that is programmed incorrectly, or mechanical apparatus that mechanically amplifies an uncontrolled load.

Integrating the pressure relief valve 146 into separator block 44 is desirable because there is generally provision around the middle separator block 44 to provide for additional connections, so it is space efficient. Integrating the pressure relief valve 146 into the separate block 44 also ensures there is no reliance on the installer to specify and incorporate one externally for safe operation. The pressure relief valve 146 can be configured to the specific activation pressure necessary to protect the hydraulic seals while maximizing the functional capability of the pressure cylinder 30. Close proximity of pressure relief valve 146 to the advance working chamber 100 further ensures minimal reaction time to prevent over-pressurization.

The overpressure circuit 148 normally blocks fluid flow between the advance working chamber 100 and a lower pressure passage, such as the retract passage 80. In one example, the pressure relief valve 146 is a passive, mechanical valve, such a bypass valve that is biased to a closed position by a spring. The pressure relief valve 146 is designed (i.e., spring force, orifice sizes, etc.) to overcome the spring force and open the bypass valve at a threshold pressure above which damage may occur to the seals. In operation, fluid from the advance working chamber 100 is provided to a side of the bypass valve opposite the spring via the working pressure monitoring port 48*g*. If the fluid reaches the threshold pressure, the spring is compressed, and the shuttle valve moves to fluidly connect the working pressure monitoring port 48*g* to the retract passage 80.

The system in FIG. 7 may also include the pressure relief valve 146 and overpressure circuit 148, as shown in FIG. 8 and described above.

The intensification (amplification) ratio provides the capability to simply produce a range of output forces with a limited range of input pressure. In resistance welding, this is useful to perform tip dressing at a low force, welding at a high force, and forging at a higher force. While the pressure range is limited for an air system using shop supplied compressed air at 20 psi to 65 psi, the 10 psi to 300 psi range of hydraulic pressure supplied by pump 56 enables a broader output force range having high precision.

The hydraulic amplification of the invention is highly efficient in transferring energy from the motor to the cylinder rod, and vice-versa. The disclosed arrangement employs a single hydraulic fluid pump and an elegant (simple and well structured) arrangement of hydraulic control elements to operate both the working and intensification functions. In addition to eliminating the requirement for compressed air, this high-thrust actuator system delivers servo-like control of working rod speed, position, and thrust.

Configuration and tuning of the system for position, pressure, and torque control is easily accomplished because the load is a fairly simple pump that is loaded in principally one direction. Configuration and tuning scales the control parameters to provide the optimum cylinder response based on factors such as the cylinder bore size and the pump size. The result is a system that is similar to a transmission in its ability to efficiently deliver both high-speed low-force and low-speed high-force output.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A hydraulic pressure cylinder system, comprising:

a pressure cylinder including a working cylinder and an intensification cylinder divided by a separator block, a working piston arranged in the working cylinder and connected to a working rod extending to an end portion, the working piston separating the working cylinder into an advance working chamber and a retract working chamber, an intensification piston and an intensification rod arranged in the intensification cylinder, the intensification piston separating the intensification cylinder into an advance intensification chamber and a retract intensification chamber;

a pump configured to provide a pressurized hydraulic fluid to the pressure cylinder;

a fluid reservoir configured to supply a hydraulic fluid to the pump;

a first valve configured to selectively regulate hydraulic fluid flow between the pressure cylinder and the fluid reservoir and the pump, the pump selectively fluidly connected to the retract working chamber and the retract intensification chamber through a retract passage via the first valve;

a second valve configured to selectively regulate fluid flow between the first valve and the advance intensification chamber;

an overpressure circuit fluidly connecting the advance working chamber and the retract passage, a pressure relief valve arranged in overpressure circuit, wherein the pressure relief valve is configured to open from a normally closed position to communicate fluid from the advance working chamber to the retract passage when the advance working chamber reaches an undesired threshold; and a controller in communication with the first valve and the second valve, the controller configured to coordinate movement of the working piston and the intensification piston between a rest state, an advancing state, an advanced state, an intensified state, and a retracted state, wherein the advanced state is configured to engage the end portion with a workpiece, and the intensified state is configured to perform an operation on the workpiece with the end portion.

2. The system of claim 1, comprising:

a supply passage fluidly connecting the fluid reservoir to a supply side of the pump;

a pressurized fluid passage fluidly connecting a pressure side of the pump to the first valve;

a return passage fluidly connecting the first valve to the fluid reservoir; and an advance passage fluidly connecting the first valve to the advance working chamber.

3. The system of claim 2, wherein the first valve is a 4-way valve including:

a first position configured to fluidly connect the pressurized fluid passage to the return passage;

a second position configured to fluidly connect the pressurized fluid passage to the advance passage, and to fluidly connect the retract passage to the return passage; and a third position configured to fluidly connect the advance passage to the return passage, and to fluidly connect the pressurized fluid passage to the retract passage.

4. The system of claim 3, wherein the first valve is mounted to the fluid reservoir.

5. The system of claim 3, wherein the second valve is a directional valve including:

a first position fluidly blocking fluid flow from the advance passage to the advance intensification chamber; and a second position fluidly connecting the advance passage to the advance intensification chamber.

6. The system of claim 5, wherein the second valve is integrated with an end block of the pressure cylinder.

7. The system of claim 5, comprising an equalization circuit fluidly connecting an intensification passage to the retract passage, the equalization circuit including a check valve configured to block fluid flow from the retract passage to the intensification passage but permit fluid flow from the intensification passage to the retract passage via a flow metering orifice.

8. The system of claim 7, wherein the equalization circuit is integrated with an end block of the pressure cylinder.

9. The system of claim 5, wherein the rest state comprises the first valve in the first position, and the working piston and the intensification piston are both in retracted positions.

10. The system of claim 5, wherein the advancing state comprises the first valve in the second position and the second valve in the first position, with pressurized fluid configured to axially move the intensification rod toward the advance working chamber; and wherein the advanced state comprises the first valve in the second position and the second valve in the first position, with the pressurized fluid configured to continue to axially move the intensification rod toward the advance working chamber until the flow of pressurized fluid to at least the advance working chamber is blocked by the intensification rod.

11. The system of claim 5, wherein the intensified state comprises the first valve in the second position and the second valve in the second position, wherein the intensification rod impinges into the advance working chamber.

12. The system of claim 5, wherein the retracted state comprises the first valve in the third position and the second valve in the first position, with pressurized fluid configured to flow to the retract intensification chamber and the retract work chamber.

13. The system of claim 1, wherein the pressure relief valve is mounted to the separator block.

14. The system of claim 13, wherein the separator block includes a bore in which the intensification rod is at least partially arranged, a port is arranged on the separator block and fluidly connects the advance passage to the bore, wherein the port is configured to be fluidly unblocked by the intensification rod in the rest state, the advancing state, the advanced state, and the retracted state, and wherein the port is configured to be fluidly blocked by the intensification rod in the intensified state.

15. The system of claim 14, wherein the working piston and the working rod include a hole configured to receive the intensification rod in the intensified state.

16. The system of claim 1, comprising a pressure sensor in communication with the controller and in fluid communication with the advanced working chamber, the pressure sensor configured to produce a signal corresponding to a pressure within the advanced working chamber, the controller configured to monitor the signal and to command a motor driving the pump to the pressure between first and second pressure thresholds, wherein the pump is a positive displacement pump.

17. A hydraulic pressure cylinder system, comprising:

a pressure cylinder including a working cylinder and an intensification cylinder divided by a separator block, a working piston arranged in the working cylinder and connected to a working rod extending to an end portion, the working piston separating the working cylinder into an advance working chamber and a retract working chamber, an intensification piston and an intensification rod arranged in the intensification cylinder, the intensification piston separating the intensification cylinder into an advance intensification chamber and a retract intensification chamber;

a pump configured to provide a pressurized hydraulic fluid to the pressure cylinder;

a fluid reservoir configured to supply a hydraulic fluid to the pump;

a first valve configured to selectively regulate hydraulic fluid flow between the pressure cylinder and the fluid reservoir and the pump;

a second valve configured to selectively regulate fluid flow between a first valve and the advance intensification chamber;

a pressure sensor in fluid communication with the advanced working chamber, the pressure sensor configured to produce a signal corresponding to a pressure within the advance working chamber; and a controller in communication with the first valve, the second valve and the pressure sensor, the controller configured to coordinate movement of the working piston and the intensification piston between a rest state, an advancing state, an advanced state, an intensified state, and a retracted state, wherein the advanced state is configured to engage the end portion with a workpiece, and the intensified state is configured to perform an operation on the workpiece with the end portion, the controller configured to monitor the signal and to command a motor driving the pump to maintain the pressure between first and second pressure thresholds.

18. The system of claim 17, wherein the pump is a positive displacement pump.

19. A hydraulic pressure cylinder system, comprising:

a pressure cylinder including a working cylinder and an intensification cylinder divided by a separator block, a working piston arranged in the working cylinder and connected to a working rod extending to an end portion, the working piston separating the working cylinder into an advance working chamber and a retract working chamber, an intensification piston and an intensification rod arranged in the intensification cylinder, the intensification piston separating the intensification cylinder into an advance intensification chamber and a retract intensification chamber;

a pump configured to provide a pressurized hydraulic fluid to the pressure cylinder;

a fluid reservoir configured to supply a hydraulic fluid to the pump;

a first valve configured to selectively regulate hydraulic fluid flow between the pump and the advance working chamber and the retract working chamber, the pump selectively fluidly connected to the retract working chamber and the retract intensification chamber through a retract passage via the first valve;

an air source configured to provide pressurized air;

a second valve fluidly connected to the air source by another valve, the other valve configured to selectively provide the pressurized air to the second valve, wherein the second valve is configured to selectively regulate an airflow between the air source and the advance intensification chamber and the retract intensification chamber;

an overpressure circuit fluidly connecting the advance working chamber and the retract passage, a pressure relief valve arranged in overpressure circuit, wherein the pressure relief valve is configured to open from a normally closed position to communicate fluid from the advance working chamber to the retract passage when the advance working chamber reaches an undesired threshold; and a controller in communication with the first valve and the second valve, the controller configured to coordinate movement of the working piston and the intensification piston between a rest state, an advancing state, an advanced state, an intensified state, and a retracted state, wherein the advanced state is configured to engage the end portion with a workpiece, and the intensified state is configured to perform an operation on the workpiece with the end portion.

* * * * *